United States Patent
Takagi

(10) Patent No.: US 7,426,950 B2
(45) Date of Patent: Sep. 23, 2008

(54) PNEUMATIC TIRE AND METHOD OF MANUFACTURING THE TIRE

(75) Inventor: Shigemasa Takagi, Hashima (JP)

(73) Assignee: Fuji Seiko Co. Ltd., Hashima-shi, Gifu (JP)

( * ) Notice: Subject to any disclaimer, the term of this patent is extended or adjusted under 35 U.S.C. 154(b) by 526 days.

(21) Appl. No.: 10/505,851

(22) PCT Filed: Feb. 24, 2003

(86) PCT No.: PCT/JP03/01972

§ 371 (c)(1), (2), (4) Date: Aug. 25, 2004

(87) PCT Pub. No.: WO03/072374

PCT Pub. Date: Sep. 4, 2003

(65) Prior Publication Data

US 2005/0092416 A1    May 5, 2005

(30) Foreign Application Priority Data

Feb. 26, 2002    (JP) .............................. 2002-049335

(51) Int. Cl.
*B60C 9/04* (2006.01)
*B60C 9/20* (2006.01)
*B29D 30/38* (2006.01)

(52) U.S. Cl. .................... 152/526; 152/548; 156/117; 156/134; 156/174; 156/906; 156/907

(58) Field of Classification Search ................ 156/117, 156/133, 134, 174, 906, 907; 152/526, 548
See application file for complete search history.

(56) References Cited

U.S. PATENT DOCUMENTS

| | | | |
|---|---|---|---|
| 1,337,690 A | | 4/1920 | Converse et al. |
| 3,421,958 A | * | 1/1969 | Gallagher .................... 156/192 |
| 3,682,222 A | * | 8/1972 | Alderfer ..................... 152/532 |
| 3,826,297 A | | 7/1974 | Alderfer ..................... 152/354 |
| 3,933,565 A | * | 1/1976 | Printz et al. .................. 156/266 |
| 4,126,720 A | | 11/1978 | Edwards ..................... 428/294 |
| 4,231,836 A | * | 11/1980 | Ljungqvist et al. ....... 156/406.4 |

(Continued)

FOREIGN PATENT DOCUMENTS

EP    557615 A1  *  9/1993

(Continued)

OTHER PUBLICATIONS

International Preliminary Examination Report dated Oct. 28, 2004 for Intl. Pat. App. No. PCT/JP2003/001972 filed Feb. 24, 2003.

*Primary Examiner*—Geoffrey L Knable
(74) *Attorney, Agent, or Firm*—Sheridan Ross P.C.

(57) ABSTRACT

A radial pneumatic tire includes a body ply and two belts. Each of the body ply and the belts has ribbon pieces that are arranged along the circumferential direction of the tire. Each ribbon piece is joined with the adjacent ribbon pieces at the lateral sides. Each ribbon piece has parallel cords coated with rubber. The cords are arranged at a predetermined first cord interval. The cords at the joined ends of the adjacent ribbon pieces, or the cords with the joint in between, are arranged at a predetermined second cord interval. As a result, a tire having a high consistency and an improved weight balance is obtained.

6 Claims, 21 Drawing Sheets

U.S. PATENT DOCUMENTS

| | | | |
|---|---|---|---|
| 5,192,390 A * | 3/1993 | Perkins | 156/117 |
| 5,228,941 A * | 7/1993 | Panicali | 156/421 |
| 6,364,981 B1 * | 4/2002 | Smith et al. | 156/134 |
| 6,913,058 B1 * | 7/2005 | Takagi | 156/397 |
| 6,969,439 B1 | 11/2005 | Takagi | |
| 2002/0043329 A1 * | 4/2002 | Suda | 156/244.12 |
| 2002/0153083 A1 | 10/2002 | Takagi | 156/121 |

FOREIGN PATENT DOCUMENTS

| | | |
|---|---|---|
| EP | 1095761 A2 | 5/2001 |
| EP | 1226925 A1 | 7/2002 |
| EP | 1226926 | 7/2002 |
| JP | 05-294105 | 11/1993 |
| JP | 2001-145961 A * | 5/2001 |
| JP | 2001-171310 | 6/2001 |
| JP | 2001-187510 | 7/2001 |
| JP | 2001-294014 | 10/2001 |
| JP | 2001-322403 | 11/2001 |
| JP | 2002-127270 | 5/2002 |
| JP | 2002-211206 | 7/2002 |
| JP | 2003-053855 | 2/2003 |
| JP | 2003-246205 | 9/2003 |

* cited by examiner

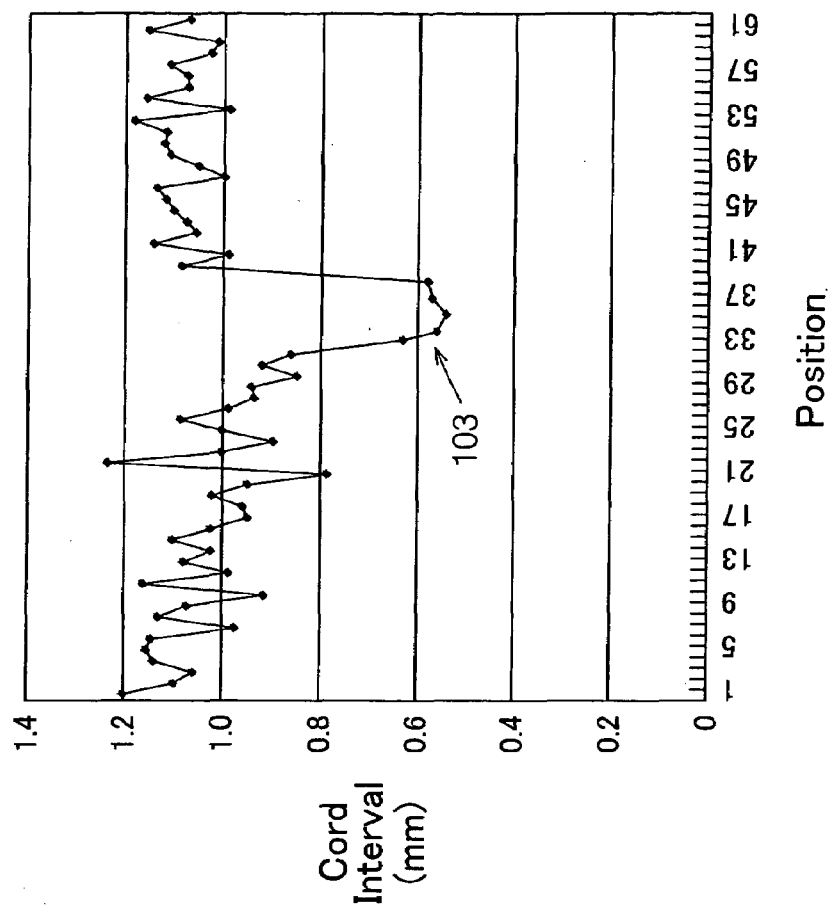
Fig.30 In The Vicinity of Overlapped Joint 103
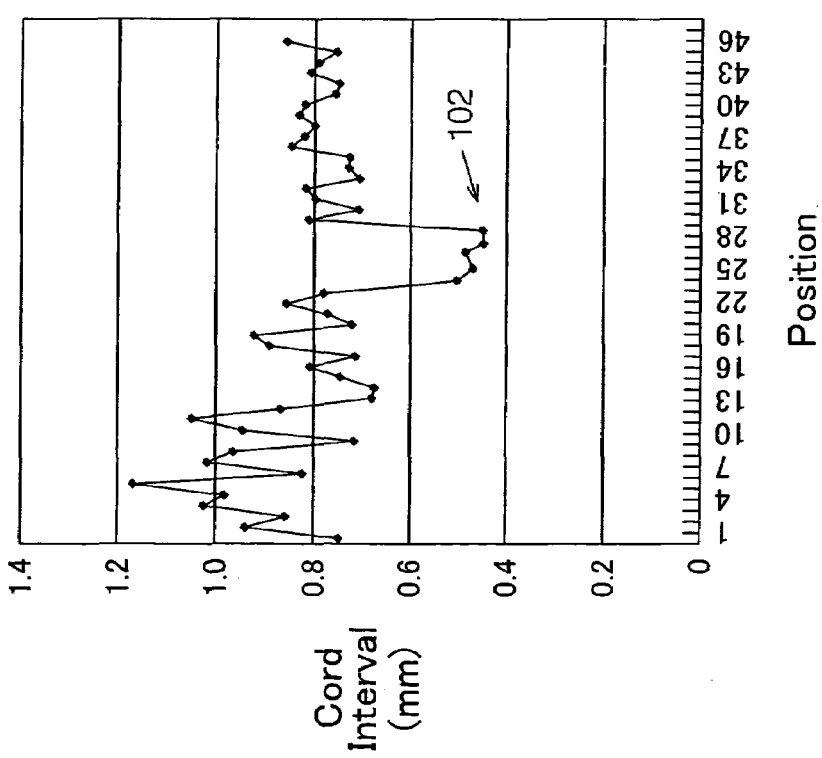
Fig.29 In The Vicinity of Overlapped Joint 102

PNEUMATIC TIRE AND METHOD OF MANUFACTURING THE TIRE

CROSS-REFERENCE TO RELATED APPLICATIONS

This application is a national stage application under 35 U.S.C. 371 of PCT Application No. PCT/JP03/01972, filed Feb. 24, 2003, which designated the United States. PCT/JP03/01972 claims priority under 35 U.S.C. §119(a)-(d) and 35 U.S.C. 365(b) from Japanese Patent Application No. 2002-049335, filed Feb. 26, 2002. The entire disclosure of each of the above-identified applications is incorporated herein by reference.

FIELD OF THE INVENTION

The present invention relates to a pneumatic tire and a method for manufacturing the pneumatic tire, and more particularly, to an arrangement of cords forming tire framework such as body plies and belts.

BACKGROUND OF THE INVENTION

A typical pneumatic tire includes a body ply and belts as members forming the tire framework. A body ply includes a number of parallel cords and rubber coating the cords. The cords of a body ply extend along the radial direction of the tire at the sides of the tire. A belt also includes a number of parallel cords and rubber coating the cords. The cords of a belt are inclined relative to the circumferential direction of the tire. Tires having such body plies and belts are typically mass-manufactured.

Body plies and belts are manufactured in the following manner. A great number of, that is, five hundred to two thousand cords that are made of organic fibers or metal filaments are arranged in parallel and are run along the longitudinal direction. The group of the parallel cords is coated with rubber from both sides by a calender to form a body ply cloth and a belt cloth. Typically, the cloths are wound and stored. As necessary, the cloths are sent to the subsequent manufacturing steps.

In the subsequent steps, the body ply cloth is unwound. The body ply cloth is then successively cut along a direction perpendicular to the longitudinal direction (longitudinal direction of the cords). As a result, a number of narrow sheets are obtained. The measurement of each sheet along the longitudinal direction of the cords substantially corresponds to the width of one tire. The direction perpendicular to the longitudinal direction of the cords corresponds to the longitudinal direction of the sheets. The sheets are joined at the ends in the longitudinal direction to form a long sheet. The long sheet is wound and stored. In a body ply using organic cords, the sheets are partly overlapped as shown by chain double-dashed lines in FIG. 27 when being joined. In FIG. 27, numeral 102 indicates an overlapped joint.

In the subsequent steps, the belt cloth is unwound. The unwound belt cloth is cut along a direction inclined relative to the longitudinal direction (longitudinal direction of the cords) to form a number of narrow sheets. Each sheet has a width corresponding to one or two tires. As in the case of the narrow sheets for body ply, the narrow sheets for belt are joined at the ends in the longitudinal direction to form a long sheet. The long sheet is wound and stored. The sheets are butted against each other as shown by chain double-dashed lines in FIG. 31 when being joined. In FIG. 31, numeral 108 indicates a butted joint.

The wound body ply long sheet and the wound belt long sheet are unwound in subsequent steps and cut to obtain sheet pieces each having a length and a width corresponding to a single tire. Then, the sheets are joined at the ends to be annular on a forming drum. A body ply and belts are thus formed. The sheet pieces of the body ply, in which organic fibers are used, are joined by overlapping the ends as shown by solid line in FIG. 27. The sheet pieces of the belt, in which steel cords are used, are joined by butting the ends as shown by solid lines in FIG. 31. In FIG. 27, numeral 103 indicates an overlapped joint when the body ply sheet pieces are formed into an annular body. In FIG. 31, numeral 200 indicates a butted joint when the belt sheet pieces are formed into an annular body. Therefore, a finished annular body ply 101 has the overlapped joints 103 in addition to the overlapped joints 102. A finished annular belt has the butted joints 200 in addition to the butted joints 108.

A pneumatic tire having the above body ply and belts have the following drawbacks.

First, drawbacks of the body ply 101 will be described. As shown in FIGS. 28 to 30, the cord interval R1 (see FIG. 27) in the overlapped joints 102, 103 is narrower than the cord interval R2 in the parts other than the overlapped joints 102, 103 (see FIG. 27). FIG. 28 diagrammatically shows the cord intervals R1, R2 of the body ply 101. Specifically, FIG. 28 shows the cord intervals R1, R2 in the vicinity of the humps when viewed in the axial direction of the tire (when viewed from a side). A circle 104 of FIG. 28 indicates a case where the cord intervals of the body ply 101 are 1 mm at any point in the circumference of the tire. An undulating annular line 105 represents the actual cord intervals of the body ply 101. FIG. 29 shows the cord intervals in the vicinity of an overlapped joint 102 when the narrow sheets are joined. FIG. 30 shows the cord intervals in the vicinity of an overlapped joint 103 when the body ply is formed into an annular body. As obvious from FIGS. 28 to 30, the cord intervals are smaller (the cords are denser) at the overlapped joints 102, 103 than in the other portions.

In the calender process, the cord intervals are inevitably made different between groups of the parallel cords at the center and groups of the parallel cords at the sides. Cloth formed with the calender therefore has uneven cord intervals in the lateral direction.

The width of a cloth manufactured by the calender, or the length of the narrow sheets obtained by cutting the cloth, is generally shorter than the circumference of a tire although there are exceptions depending on the sizes of the tires. Therefore, as obvious from FIG. 28, the sheet pieces needed for forming a body ply 101 in one tire has at least one overlapped joint 102. Thus, the finished body ply 101 has the overlapped joints 102 between the narrow sheets and the overlapped joints 103 between the ends of the sheet pieces. The locations and the numbers of the overlapped joints differ from one tire to another. In addition, when winding and unwinding sheet material for body plies, tension is applied to the sheet material, which increases the unevenness of the cord intervals.

As a result, as obvious in FIGS. 27 to 30, a finished body ply has randomly arranged overlapped joints 102, 103, which greatly vary the cord intervals. The cord intervals are uneven over the entire circumference of the tire.

Next, drawbacks of the belt will now be described. To prevent the steel cords 109 from being stacked, the cord 109 is removed at the butted joint 108 between the narrow sheets and at the butted joint 200 between the sheet pieces as shown in FIG. 31. The removed cord 109 is shown by chain double-dashed line.

Therefore, as shown in FIGS. 32 to 34, the cord interval S1 (see FIG. 31) in the butted joints 108, 200 is wider than the cord intervals S2 in the parts other than the butted joints 108, 200 (see FIG. 31). As in the case of the body ply, the length of the narrow sheet is generally shorter than the circumference of the tire. Therefore, a finished belt has at least two butted joints 108, 200. In addition, as in the case of the body ply, the locations and the numbers of the butted joints differ from one tire to another. Also, tension applied to the belt during manufacture increases the unevenness of the cord intervals.

A tire having the above body ply and the belts is not satisfactory in terms of the consistency as a product.

The unevenness of the cord intervals in the body ply and the belts described above creates an uneven weight distribution in the circumferential direction of the tire. The degree of the unevenness of the weight distribution differs from one tire to another.

To reduce the imbalance, the weight balance is measured when the tire is attached to a wheel, and led weights are attached to sections of the wheel rim as necessary. However, the balance measurement and the attaching of the weights are troublesome and increase the cost. While the vehicle is running, an impact applied to the wheel can remove the weights from the wheel rim. In this case, the weight balance of the tire in the circumferential direction is disturbed, which causes the vehicle body to vibrate.

Japanese Laid-Open Patent Publication No. 49-76978, corresponding to U.S. Pat. No. 3,826,297, discloses a technology for forming plies and belts. In this technology, ribbons that are coated with rubber and reinforced with cords are arranged such that the sides are butted against each other. Japanese Laid-Open Patent Publication No. 2001-145961, corresponding to European Patent No. EP1226926, discloses a technology for forming annual plies. In this technology, a cylindrical body is formed by consecutively winding a ribbon that is coated with rubber and reinforced with cords. The cylindrical body is cut to form plate bodies. The annular ply is formed with the plate bodies.

An objective of Japanese Laid-Open Patent Publication 49-76978 (U.S. Pat. No. 3,826,297) is to form radial tire frameworks with a simple apparatus. An objective of Japanese Laid-Open Patent Publication No. 2001-145961 (EP 1226926) is to form plies at low cost without using a large apparatus. However, these publications do not present any concept of making the cord intervals in rubber coated ribbons uniform or of making the cord intervals in the circumferential direction of a tire to manufacture tires having an improved weight balance.

SUMMARY OF THE INVENTION

Accordingly, it is an objective of the present invention to provide a pneumatic tire and a method for manufacturing the pneumatic tire, which pneumatic tire has a high consistency as a product and a favorable weight balance.

To achieve the foregoing and other objectives and in accordance with the purpose of the present invention, a pneumatic tire having a tire framework is provided. The tire framework includes a plurality of ribbon pieces arranged along the circumferential direction of the tire. Each ribbon piece is joined to the adjacent ribbon pieces at the sides in the lateral direction. Each ribbon piece has a plurality of cords and rubber coating the cords. The cords extend in the longitudinal direction of the ribbon piece and are arranged in parallel at a predetermined first cord interval. The tire is characterized in that each pair of adjacent cords, with the joint of the adjacent ribbon pieces in between, is arranged at a predetermined second cord interval, and in that the second cord interval is substantially equal to the first cord interval.

The present invention also provides a method for manufacturing a tire framework of a pneumatic tire. This method is characterized by: preparing a long ribbon having a plurality of parallel cords coated with rubber, the cords being arranged at a predetermined first cord interval; forming a cylindrical body by helically winding the long ribbon, wherein the sides of each adjacent pair of turns of the ribbon are joined such that the interval of the adjacent cords, with the joint of the sides in between, is substantially equal to the first cord interval; cutting the cylindrical body to obtain a plate body, wherein, when the cylindrical body is cut, the long ribbon is divided into a plurality of ribbon pieces with each adjacent pair-joined to each other, and the plate body having the parallel ribbon pieces is obtained; and forming the tire framework from the plate body, wherein the plate body is made annular to form the tire framework, and wherein the sides of the two ribbon pieces at the ends of the annular plate body are joined such that the interval of the adjacent cords, with the joint of the sides in between, is substantially equal to the first cord interval.

The present invention provides another pneumatic tire having a tire framework. The tire framework includes a plurality of ribbon pieces arranged along the circumferential direction of the tire. Each ribbon piece is joined to the adjacent ribbon pieces at the sides in the lateral direction. Each ribbon piece has a plurality of cords and rubber coating the cords. The cords extend in the longitudinal direction of the ribbon piece and are arranged in parallel. The tire is characterized by groups of parallel cords. The cords in each group form a specific cord arrangement pattern that is identical to the arrangement pattern of the cords in the other groups. The groups are consecutively and uniformly arranged along the circumferential direction of the tire so that a regular cord arrangement cycle appears over the entire circumference of the tire.

In addition, the present invention provides another method for manufacturing a tire framework of a pneumatic tire. The method is characterized by: preparing a long ribbon having a plurality of cords coated with rubber, the cords being arranged in parallel to form a specific cord arrangement pattern; forming a cylindrical body by helically winding the long ribbon, wherein the sides of each adjacent pairs of turns of the ribbon are joined such that the interval of the adjacent cords, with the joint of the sides in between, is a predetermined cord interval; cutting the cylindrical body to obtain a plate body, wherein, when the cylindrical body is cut, the long ribbon is divided into a plurality of ribbon pieces with each adjacent pair joined to each other, and the plate body having the parallel ribbon pieces is obtained; and forming the tire framework from the plate body, wherein the plate body is made annular to form the tire framework, and wherein the sides of the two ribbon pieces at the ends of the annular plate body are joined such that the interval of the adjacent cords with the joint of the sides in between is substantially equal to the predetermined cord interval.

The present invention further provides another method for manufacturing a tire framework of a pneumatic tire. The method is characterized by: preparing a long ribbon having a plurality of parallel cords coated with rubber; forming a cylindrical body by helically winding the long ribbon, wherein the sides of each adjacent pair of turns of the ribbon are joined while being pressed against each other with a predetermine force such that a predetermined cord interval is created between the adjacent cords with the joint of the sides in between; cutting the cylindrical body to obtain a plate body, wherein, when the cylindrical body is cut, the long ribbon is divided into a plurality of ribbon pieces with each adjacent pair joined to each other, and the plate body having the parallel ribbon pieces is obtained; and forming the tire framework from the plate body, wherein the plate body is made annular to form the tire framework, and wherein the sides of the two ribbon pieces at the ends of the annular plate body are joined while being pressed against each other with a predetermined force such that the interval of the adjacent cords, with the joint of the sides in between, is substantially equal to the predetermined cord interval.

BRIEF DESCRIPTION OF THE DRAWINGS

FIG. 29 is a graph showing the cord intervals in the vicinity of the joint 102 of FIG. 28;

FIG. 30 is a graph showing the cord intervals in the vicinity of the joint 103 of FIG. 28;

DETAILED DESCRIPTION OF THE PREFERRED EMBODIMENTS

A first embodiment of the present invention will now be described with reference to FIGS. 1 to 20.

Figure 1:
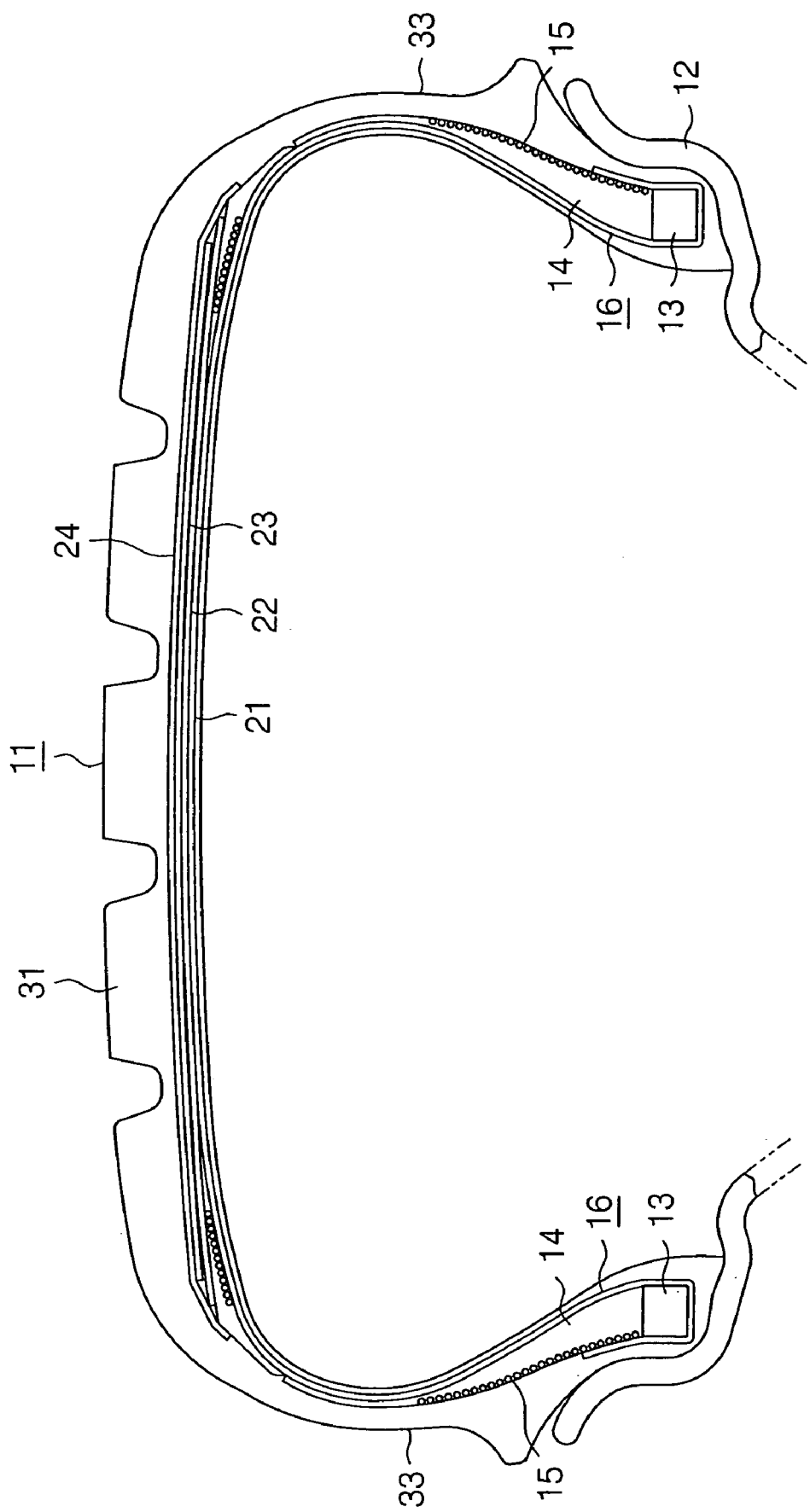
FIG. 1 is a cross-sectional view illustrating a pneumatic tire according to a first embodiment of the present invention.

A pneumatic tire 11 of this embodiment is supported by wheel rims 12 as shown in FIG. 1. The pneumatic tire 11 is a radial tire the aspect ratio of which is equal to or less than 60%. The size of the pneumatic tire 11 is, for example, 215/45ZR17.

The pneumatic tire 11 has a tread 31, a pair of sidewalls 33, and a pair of beads 16. The sidewalls 33 extend radially inward from the sides of the tread 31. The beads 16 are attached to the wheel rims 12. Each bead 16 includes a bead core 13 made of a bundle of steel cords, a bead filler 14 made of hard rubber, and a bead reinforcing layer 15. A body ply 21 is located between the bead cores 13. The ends of the body ply 21 are bent outward from the interior of the tire 11 to encompass the bead cores 13.

A circumferentially extending first and second belts 22, 23 are overlapped on the crown of the body ply 21 (a part corresponding to the tread 31). Each belt 22, 23 is formed by coating steal cords with rubber. A cap belt 24 is located about the belts 22, 23. In this embodiment, the body ply 21 and the first and second belts 22, 23 form the tire framework.

The rubber forming the sidewalls 33 covers the outer portions of the sides of the body ply 21. The rubber forming the tread 31 covers the outer circumference of the cap belt 24.

Figure 2:
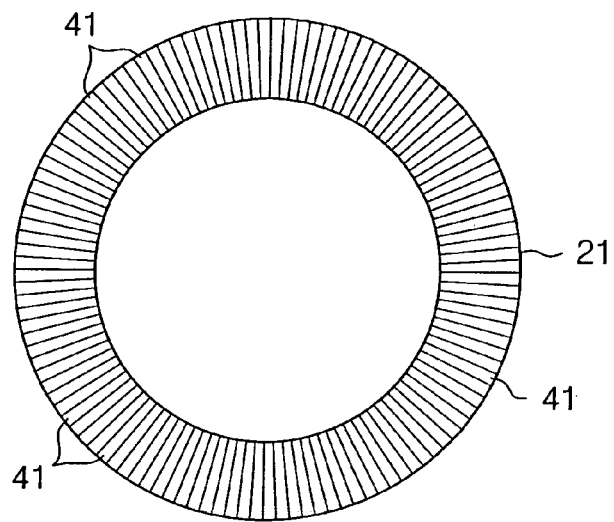
FIG. 2 is a side view showing a body ply of the tire shown in FIG. 1.
Figure 3:
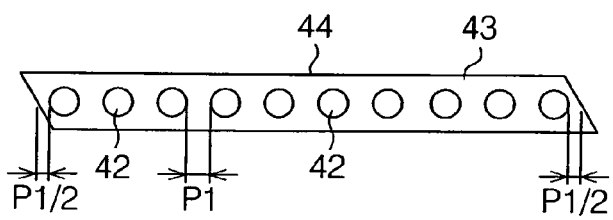
FIG. 3(a) is a cross-sectional view showing a ribbon for body ply.
FIG. 3(b) is a partially cross-sectional view showing the body ply of the first embodiment, which is formed with the ribbon shown in FIG. 3(a)
FIG. 3(c) is a partially cross-sectional view showing a body ply according to a second embodiment, which is formed with the ribbon shown in FIG. 3(a)
FIG. 3(d) is a cross-sectional view showing a ribbon for body ply according to a modification.
Figure 3:
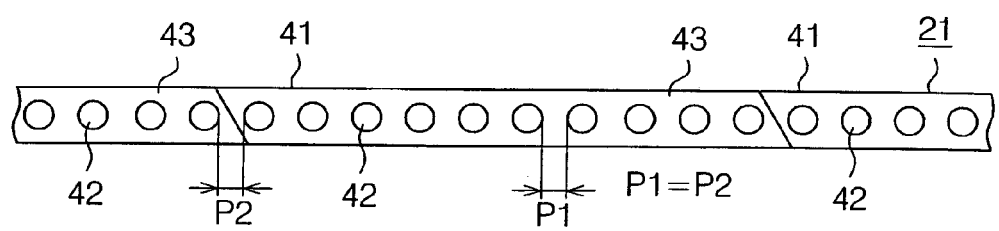
Figure 3:
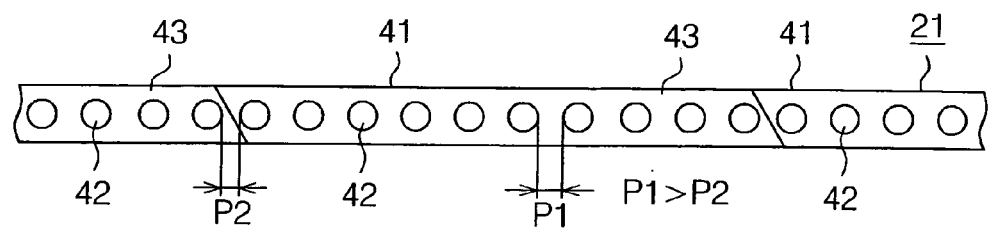
Figure 3:
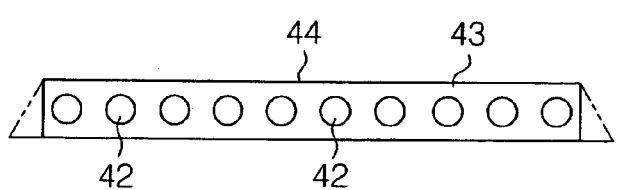

As shown in FIGS. 2, 3(a), and 3(b), the body ply 21 includes ply ribbon pieces 41. The ply ribbon pieces 41 are obtained from a single long ply ribbon 44 coated with rubber. The ply ribbon 44 has substantially a parallelogram cross-section. The ply ribbon 44 is manufactured in the following manner. That is, a plurality of (ten in this embodiment) organic fiber ply cords 42 are arranged at equal intervals with a comb guide. In this state, the ply cords 42 are passed through a rubber extruder at a predetermined speed while receiving a predetermined tension. As a result, the group of the parallel ply cords 42 is coated with rubber 43 so that each adjacent pair of the ply cords 42 is suspended with an equal interval P1 in the rubber 43. The interval P1 between each adjacent pair of the ply cords 42 will hereinafter be referred to as cord interval P1. The number of the ply cords 42 in the ply ribbon 44 is selected from a range from five to twenty. More preferably, the number of the ply cords 42 is selected from a range from seven to thirteen. If the number of the ply cords 42 is less than five, the production efficiency of the ply ribbon 44 will deteriorate. If the number of the ply cords 42 is more than twenty, the control of the spaces between the cords 42 will be troublesome, and the size of the apparatus for manufacturing the ply ribbon 44 is increased.

Figure 13:
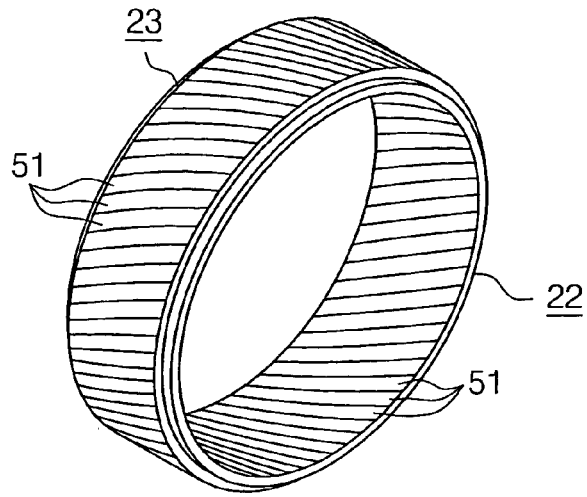
FIG. 13 is a perspective view showing a first belt and a second belt of the tire shown in FIG. 1.
Figure 14:
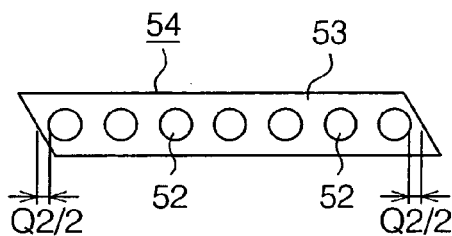
FIG. 14(a) is a cross-sectional view showing a ribbon for belt.
FIG. 14(b) is a partially cross-sectional view showing the belt of the first embodiment, which is formed with the ribbon shown in FIG. 14(a)
FIG. 14(c) is a partially cross-sectional view showing the belt of the second embodiment, which is formed with the ribbon shown in FIG. 14(a)
FIG. 14(d) is a cross-sectional view showing a ribbon for belt according to a modification.
Figure 14:
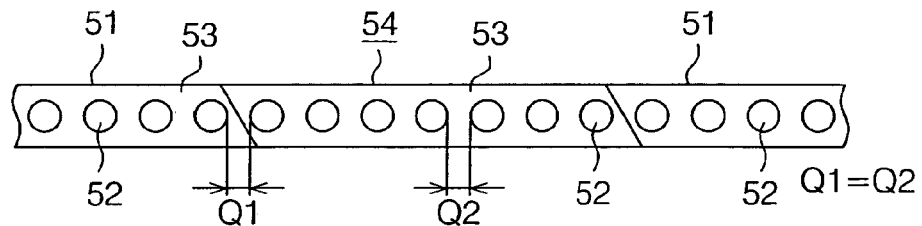
Figure 14:
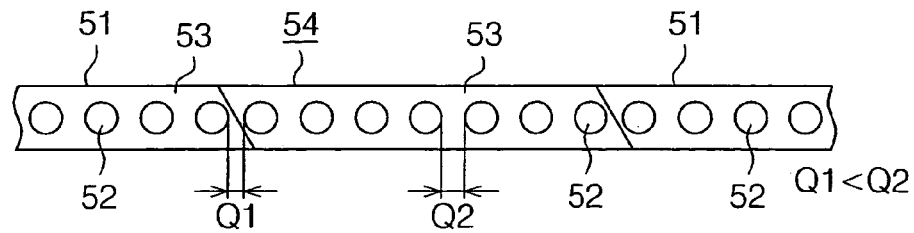
Figure 14:
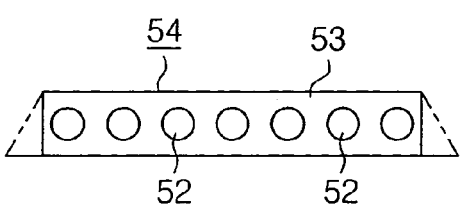

As shown in FIGS. 13, 14(a), and 14(b), each of the first and second belts 22, 23 includes belt ribbon pieces 51. The belt ribbon pieces 51 are obtained from one long belt ribbon 54 coated with rubber. The belt ribbon 54 has substantially a parallelogram cross-section. The belt ribbon 54 is manufactured in the following manner. That is, a plurality of (seven in this embodiment) belt cords 52 made of organic fibers or inorganic filaments (in this embodiment, steel cords 52) are arranged at equal intervals with a comb guide. In this state, the belt cords 52 are passed through a rubber extruder at a predetermined speed while receiving a predetermined tension. As a result, the group of the parallel belt cords 52 is coated with rubber 53 so that each adjacent pair of the belt cords 52 is suspended with an equal interval Q2 in the rubber 53. The interval Q2 between each adjacent pair of the belt cords 52 will hereinafter be referred to as cord interval Q2. The number of the belt cords 52 in the belt ribbon 54 is selected from a range from five to twenty. More preferably, the number of the belt cords 52 is selected from a range from seven to thirteen. If the number of the belt cords 52 is less than five, the production efficiency of the belt ribbon 54 will deteriorate. If the number of the belt cords 52 is more than twenty, the control of the spaces between the cords 52 will be troublesome, and the size of the apparatus for manufacturing the belt ribbon 54 is increased. The method for manufacturing the body ply 21 and the method for manufacturing the first and second belts 22, 23 will now be described.

Figure 4:
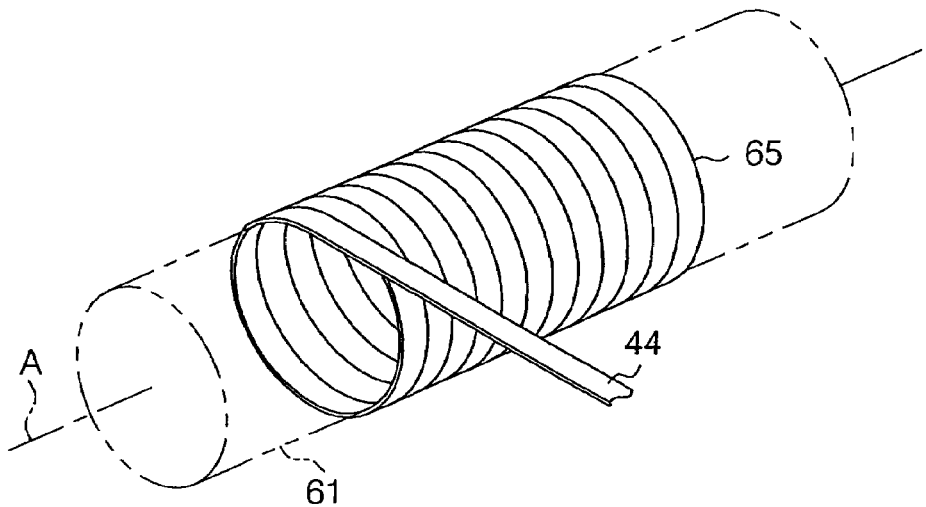
FIG. 4 is a perspective view showing a winding process of the ribbon shown in FIG. 3(a)

First, the method for manufacturing the body ply 21 will be described. As shown in FIGS. 4 and 8(a), the body ply ribbon 44 is helically wound around a cylindrical drum 61, which rotates about an axis A in one direction, such that the sides of the adjacent turns of the ply ribbon 44 contact without space in between. In the ply ribbon 44, the amount of rubber outside of each outermost ply cord 42 corresponds to half of the cord interval P1. When winding the ply ribbon 44, a pressing wheel 63 presses the sides of each adjacent pair of turns of the ply ribbon 44 against the drum 61 with an appropriate pressure as shown in FIG. 8(a). Accordingly, a cylindrical body 65 having a predetermined axial length is formed.

Figure 5:
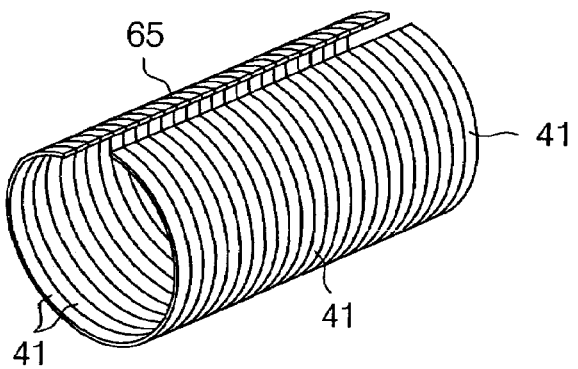
FIG. 5 is a perspective view showing a cylindrical body made of the wound ribbon shown in FIG. 4, when the cylindrical body is cut.
Figure 6:
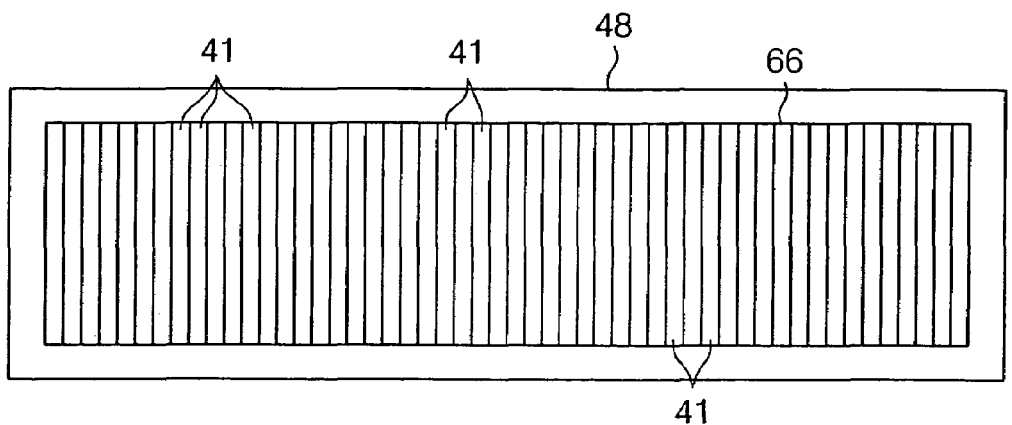
FIG. 6 is a plan view showing a developed state of the cut cylindrical body shown in FIG. 5.

Then, as shown in FIG. 5, the cylindrical body 65 is cut at a point in the circumferential direction along a direction perpendicular to the direction in which the ply ribbon 44 extends. The cut cylindrical body 65 is opened flat while being detached from the drum 61, and is placed on a tray 48 as shown in FIG. 6. As a result, a rectangular plate body 66 made of a great number of the parallel ply ribbon pieces 41 is obtained. As shown in FIG. 3(b), the interval P2 between the ply cords 42 at the contacting ends of an adjacent pair of the ply ribbon pieces 41 is substantially equal to the cord interval P1. In other words, the interval P2 between the two ply cords 42 of the adjacent ply ribbon pieces 41 with the joint in between is substantially equal to the cord interval P1.

Figure 7:
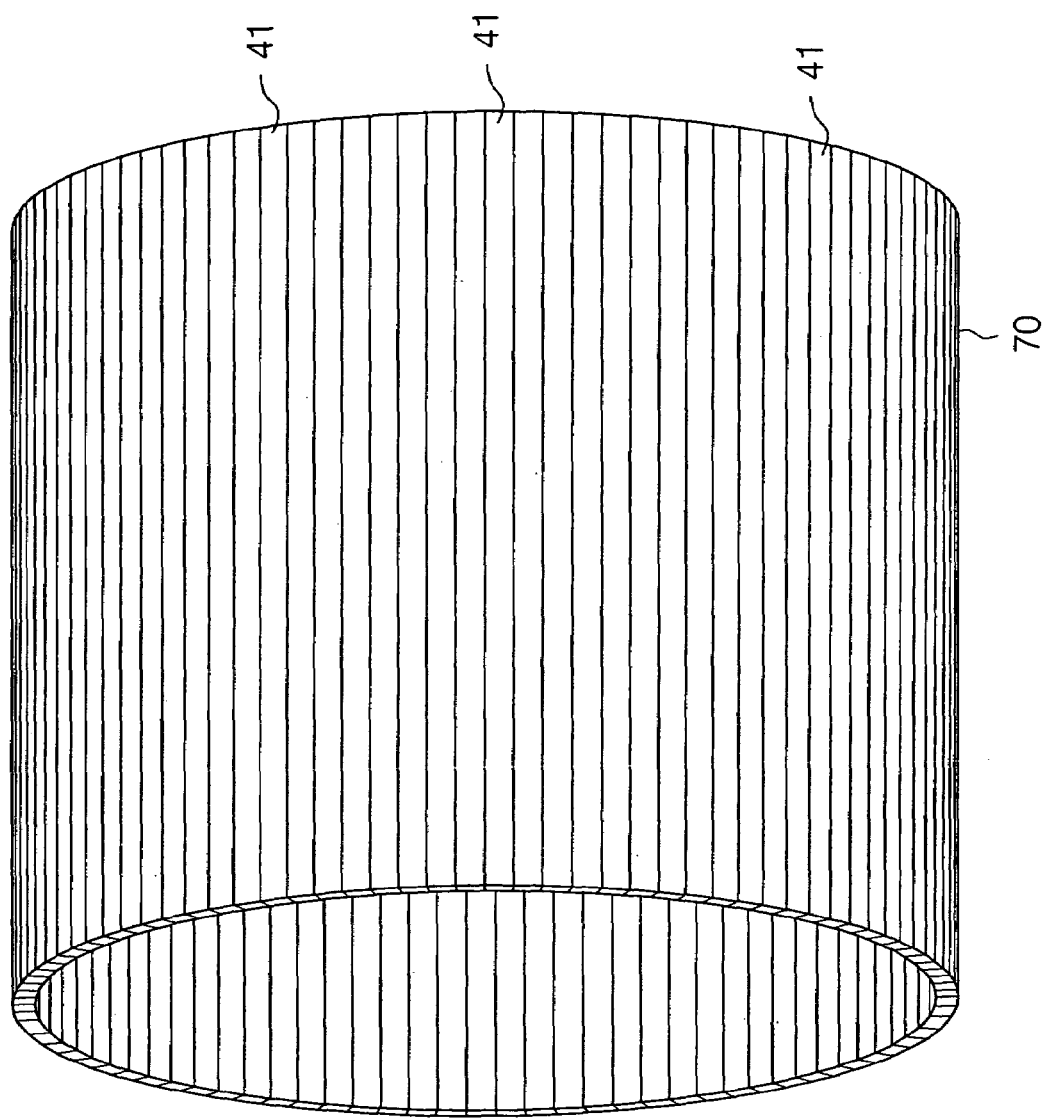
FIG. 7 is a perspective view illustrating a cylindrical prebody ply formed of the plate body shown in FIG. 6.
Figure 8:
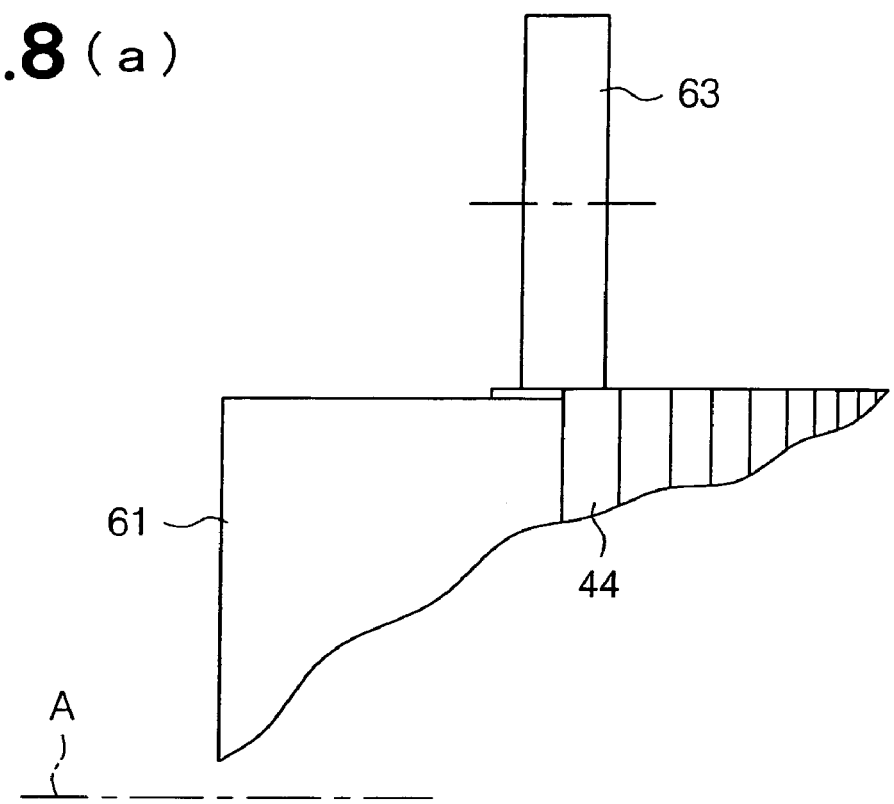
FIG. 8(a) is a partially front view showing a winding process of the ribbon for body ply according to the first embodiment.
FIG. 8(b) is a partially front view showing a winding process of the ribbon for body ply according to the second embodiment.
Figure 8:
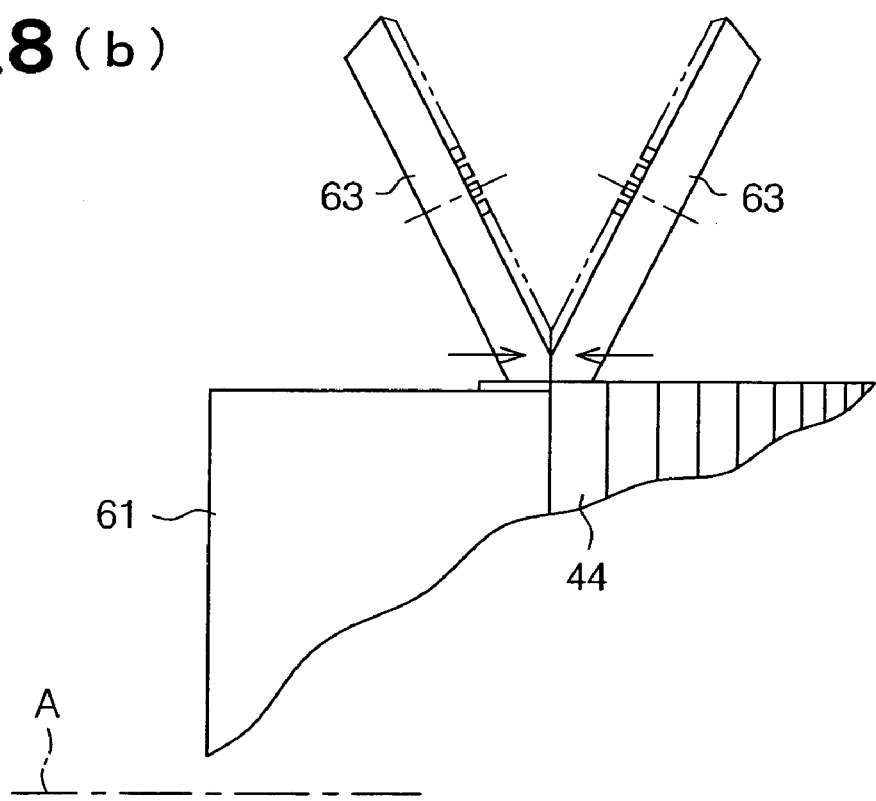
Figure 9:
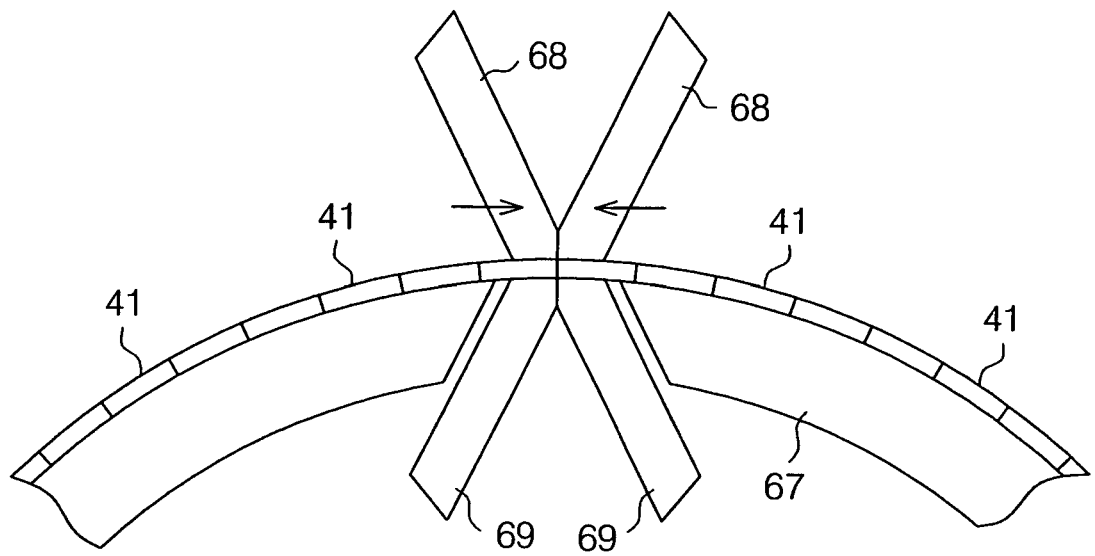
FIG. 9 is a partially front view showing a forming process of the body ply shown in FIG. 7.

Then, as shown in FIG. 9, the plate body 66 on the tray 48 is pressed against and wound around a cylindrical drum 67. The end faces of two ply ribbon pieces 41 at the ends of the plate body 66 are butted against each other by a pair of pressing-members 68 and a pair of pressing members 69, which are rollers, with no space in between. As a result, a cylindrical pre-body ply 70 shown in FIG. 7 is formed. The ply ribbon pieces 41 extend in parallel with the axis of the pre-body ply 70.

Figure 27:
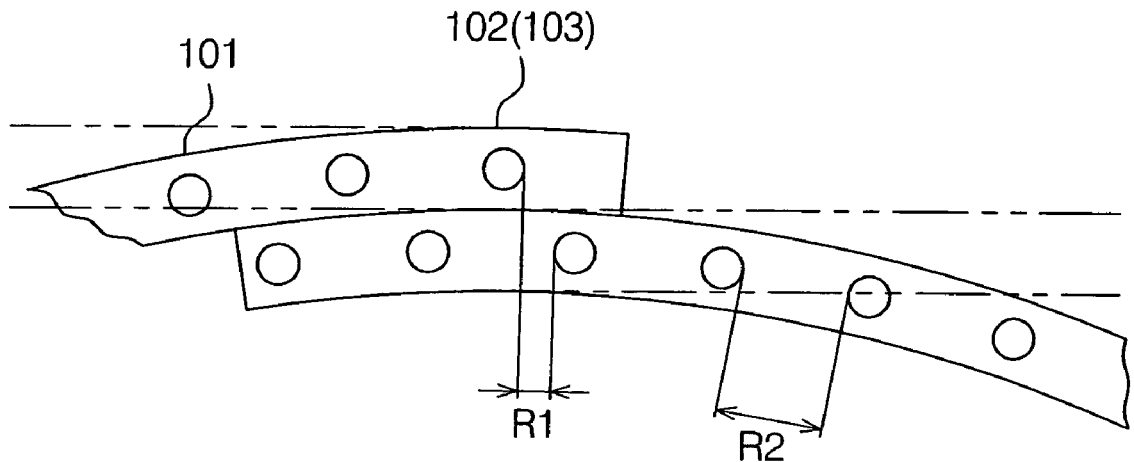
FIG. 27 is a partially cross-sectional view illustrating a joint of a prior art body ply.

The cylindrical pre-body ply 70 is formed into a toroidal body ply 21 by using a bladder that substantially has the same shape as that of the tire to be manufactured. The body ply 21 thus produced has the ply ribbon pieces 41, which are regularly arranged in the circumferential direction of the body ply 21 such that the sides of each adjacent pair are butted against each other. The ply ribbon pieces 41 do not overlap at any circumferential positions of the body ply 21. The body ply 21 has a uniform layer structure over the entire circumference. About either of the ply material or the belt material, a uniform layer structure refers to a structure in which a group of rubber coated parallel cords do not partially overlap as in the prior art shown in FIG. 27. For example, if a body play has layered groups of rubber coated parallel cords but has no overlapping parts as in the prior art shown in FIG. 27, the body ply is regarded to have a uniform layer structure.

Figure 10:
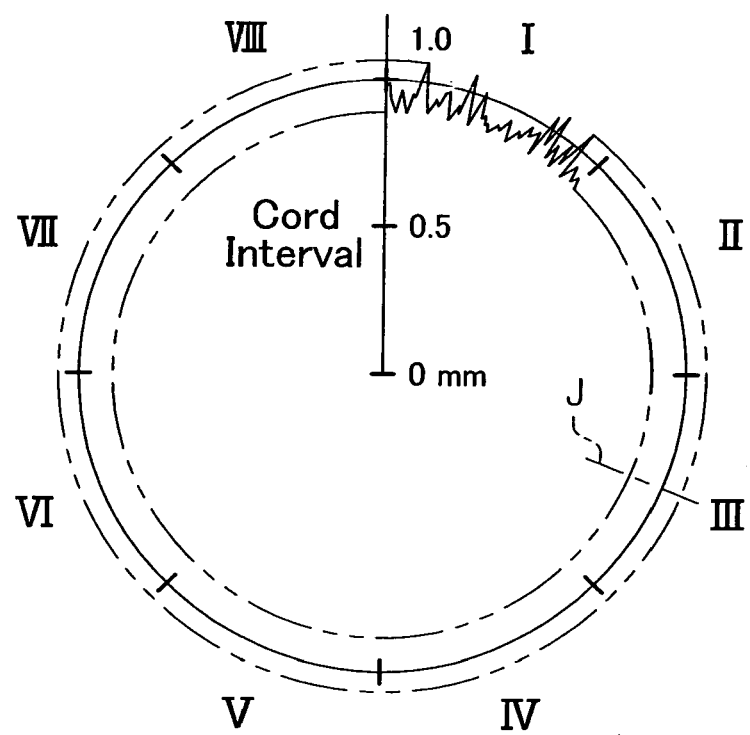
FIG. 10 is a diagram for explaining the cord arrangement of the body ply according to the first embodiment.
Figure 11:
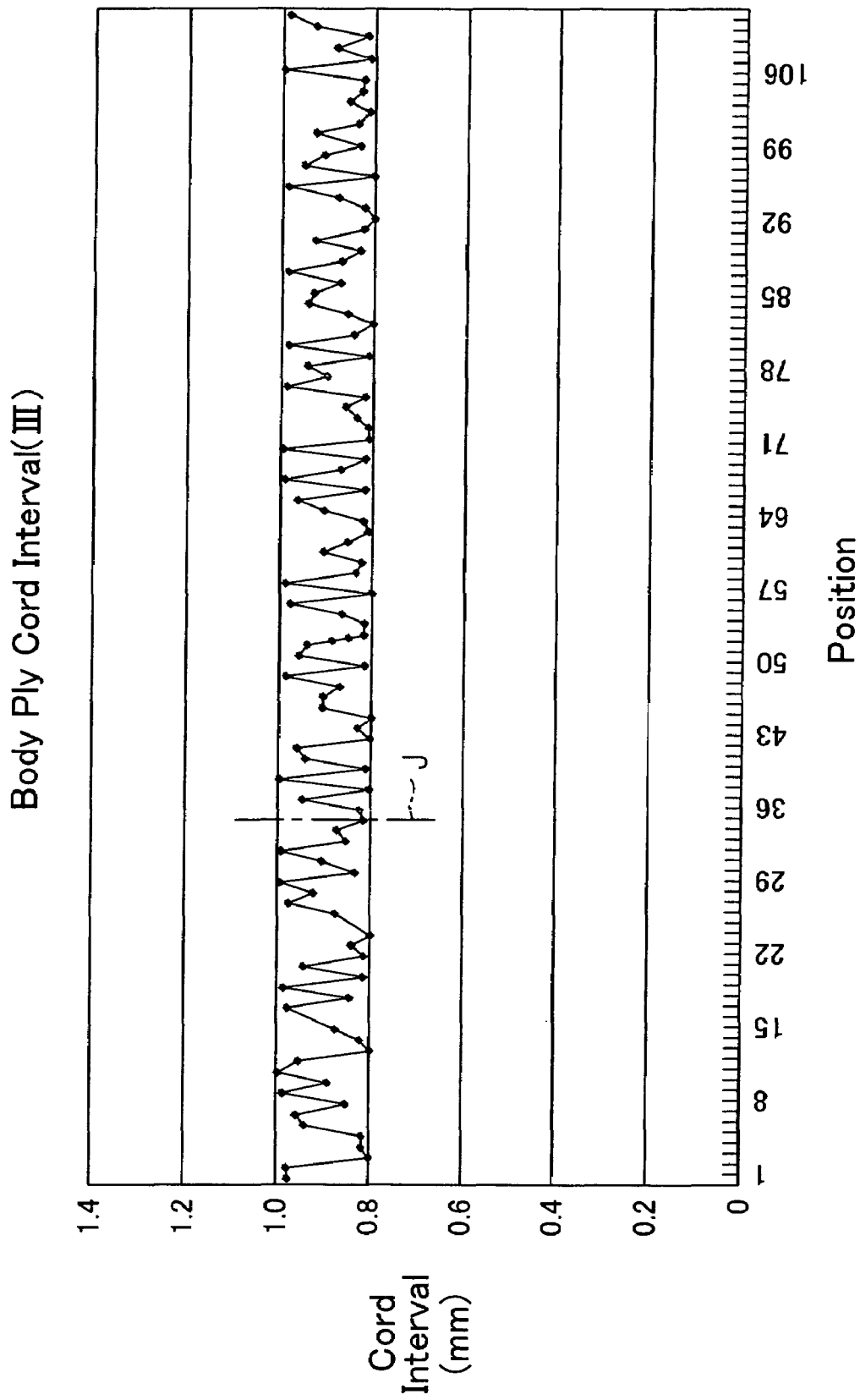
FIG. 11 is a graph showing the cord intervals in a region III of FIG. 10.
Figure 12:
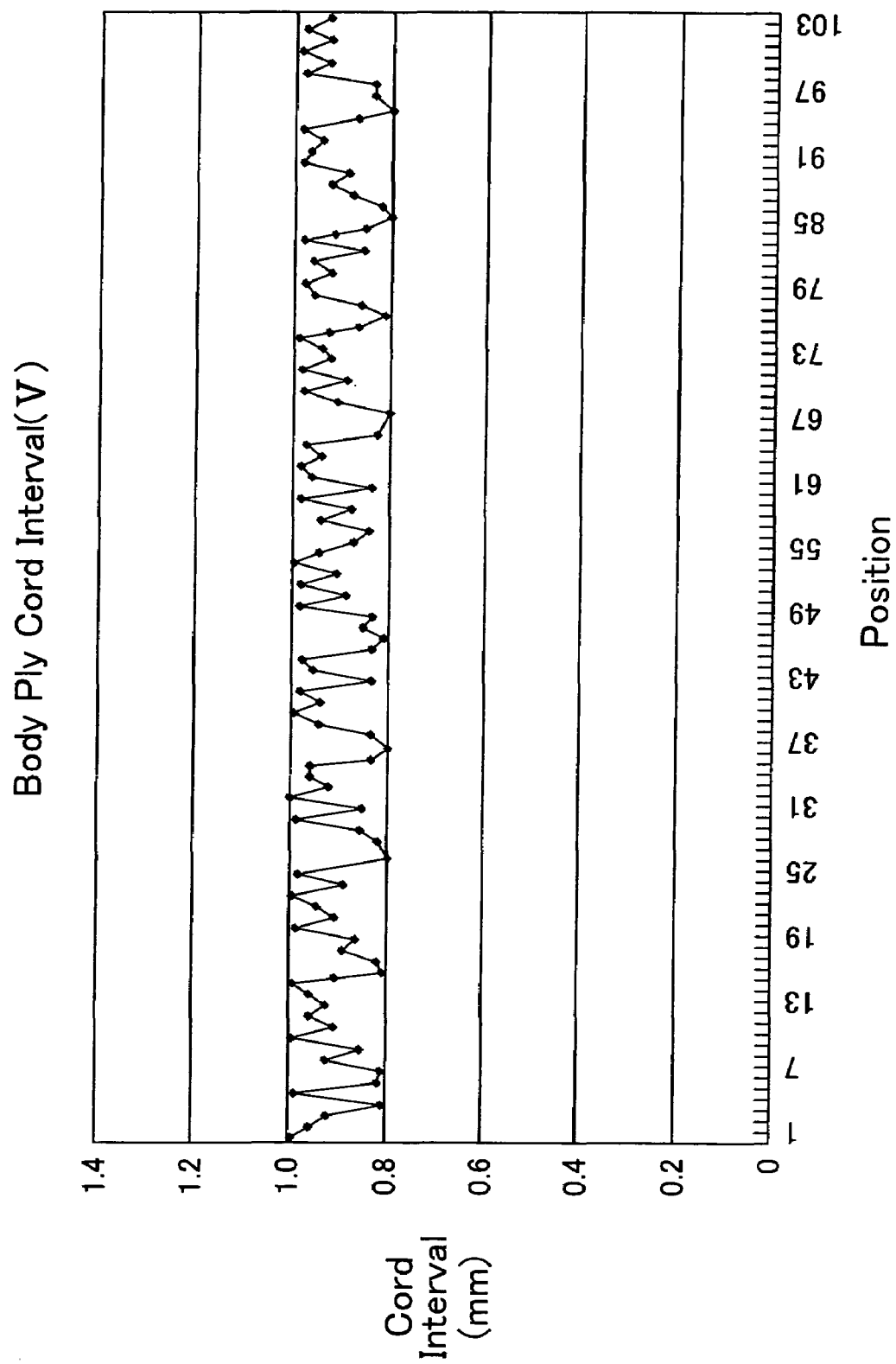
FIG. 12 is a graph showing the cord intervals in a region V of FIG. 10.
Figure 28:
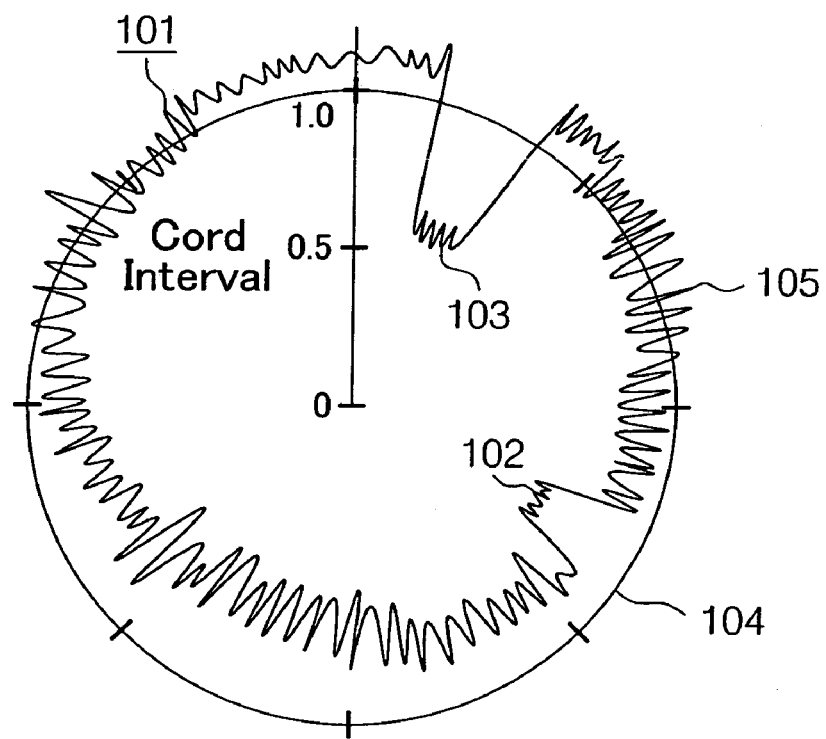
FIG. 28 is a diagram for explaining the cord arrangement of the body ply shown in FIG. 27.

FIG. 10 corresponds to FIG. 28, which shows a prior art. FIG. 11 is a graph showing the cord intervals in the region III of FIG. 10. FIG. 12 is a graph showing the cord intervals in the region V of FIG. 10. As shown in FIGS. 10 to 12, in the body ply 21 of the present invention, the cord interval P1 in each ply ribbon piece 41 is substantially equal to the cord interval P2 of each adjacent pair of the ply ribbon pieces 41. Sign J of FIGS. 10 and 11 represents a part at which the ends of the plate body 66 are butted against each other. In this embodiment, the cord intervals P1, P2 are in a range from 0.8 mm to 1.0 mm over the entire circumference of the body ply 21 including the butted part J. That is, the cord intervals P1, P2 vary by ±0.1 mm from 0.9 mm, which is a specified value. In other words, the deviation of the cord intervals P1, P2 from the specified value is in the range of ±11%. The cord intervals P1, P2 is within 0.1 to 2.5 times the diameter of the ply cords 42.

Figure 15:
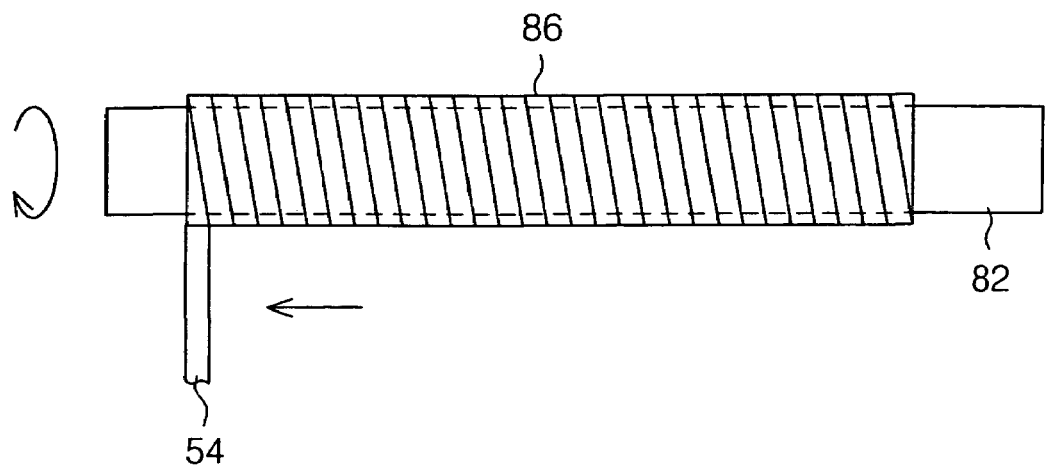
FIG. 15 is a plan view showing a winding process of the ribbon shown in FIG. 14(a)

A method for manufacturing the first and second belts 22, 23 will now be described. As shown in FIG. 15, the belt ribbon 54 shown in FIG. 14(a) is helically wound around a cylindrical drum 82, which rotates in one direction, such that the sides of the adjacent turns of the belt ribbon 54 contact without space in between. As a result, a cylindrical body 86 having a predetermined axial length is formed. As in the ply ribbon 44 shown in FIG. 3(a), the amount of rubber outside of each outermost belt cord 52 of the belt ribbon 54 corresponds to half of the cord interval Q2. Therefore, as shown in FIG. 14(b), the interval Q1 of the belt cords 52 at the contacting sides of each adjacent pair of turns of the belt ribbon 54 is substantially equal to the cord interval Q2 in the belt ribbon 54.

Figure 16:
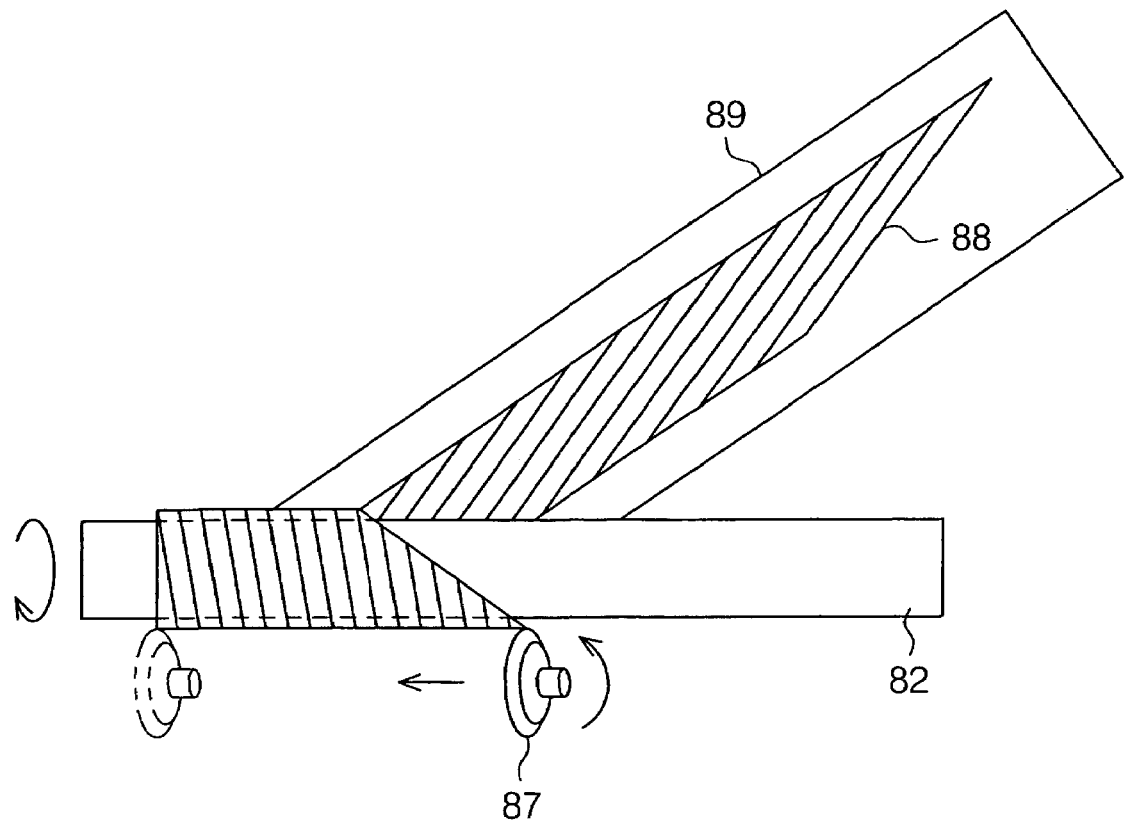
FIG. 16 is a plan view showing a process for cutting a cylindrical body made of the wound ribbon shown in FIG. 15.
Figure 17:
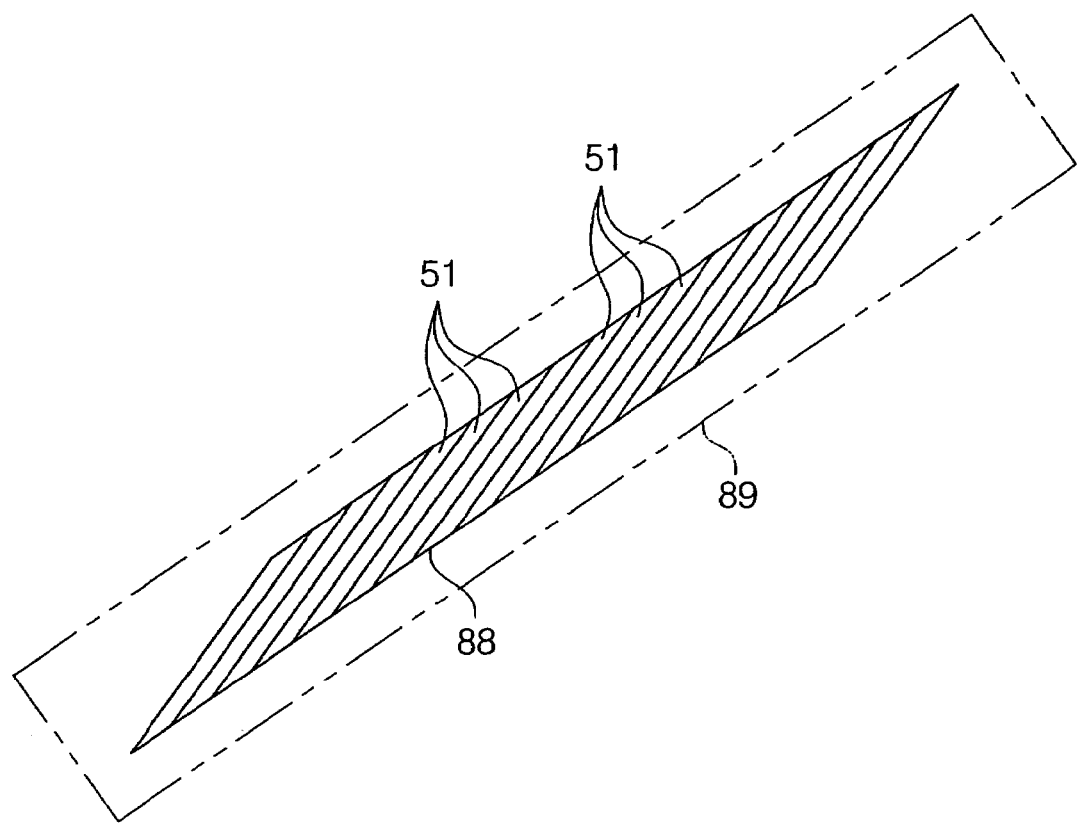
FIG. 17 is a plan view showing a developed state of the cut cylindrical body shown in FIG. 16.

Then, as shown in FIG. 16, the cylindrical body 86 is cut with a cutter 87 along a predetermined helical cutting line. The cut cylindrical body 86 is opened flat while being detached from the drum 82, and is placed on a tray 89 as shown in FIG. 17. As a result, a parallelogram plate body 88 made of a great number of the parallel belt ribbon pieces 51 is obtained.

The plate body 88 of the second belt 23 is formed in the same manner as the first belt 22.

The plate bodies 88 of the first and second belts 22, 23 are then wound around a cylindrical drum (not shown) for forming belts. The end faces of the two belt ribbon pieces 51 at the ends of each plate body 88 are butted against each other with a predetermined pressure. As a result, the first and second belts 22, 23 shown in FIG. 13 are obtained. Each belt ribbon piece 51 is inclined relative to the circumferential direction of the corresponding belts 22, 23.

The first and second belts 22, 23 thus produced have the belt ribbon pieces 51, which are regularly arranged in the circumferential direction of the corresponding belts 22, 23 such that the sides of each adjacent pair are butted against each other. The belt ribbon pieces 51 do not overlap at any circumferential positions of the corresponding belts 22, 23. The belts 22, 23 each have a uniform layer structure over the entire circumference.

Figure 18:
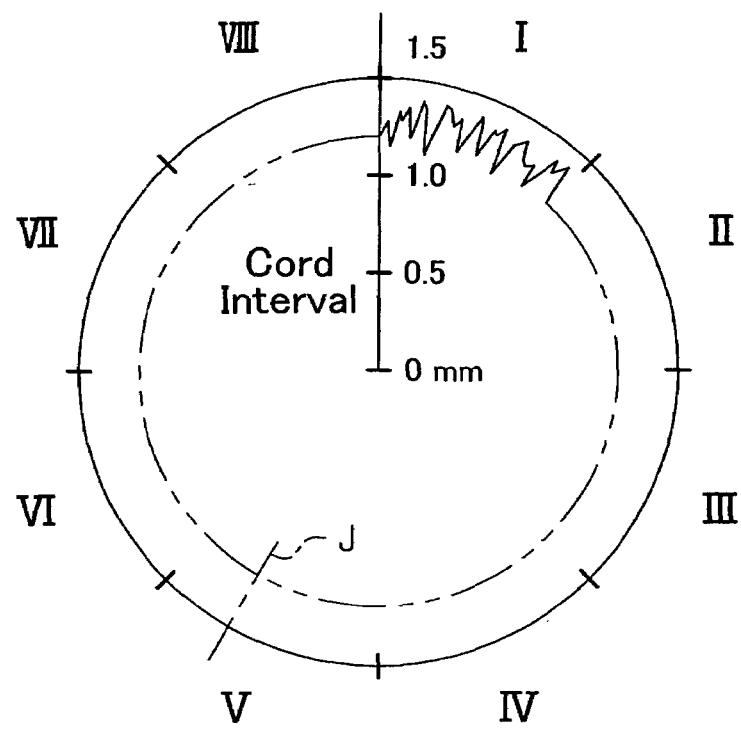
FIG. 18 is a diagram for explaining the cord arrangement of the belt according to the first embodiment.
Figure 20:
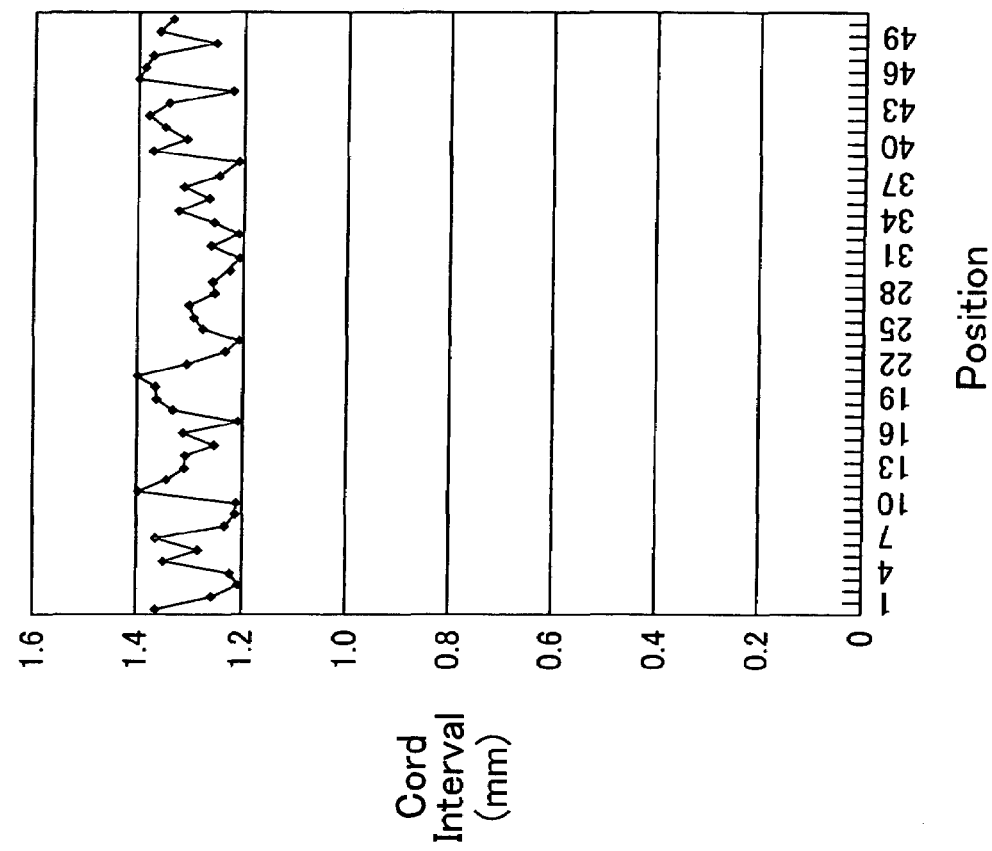
FIG. 20 is a graph showing the cord intervals in a region V of FIG. 18.
Figure 19:
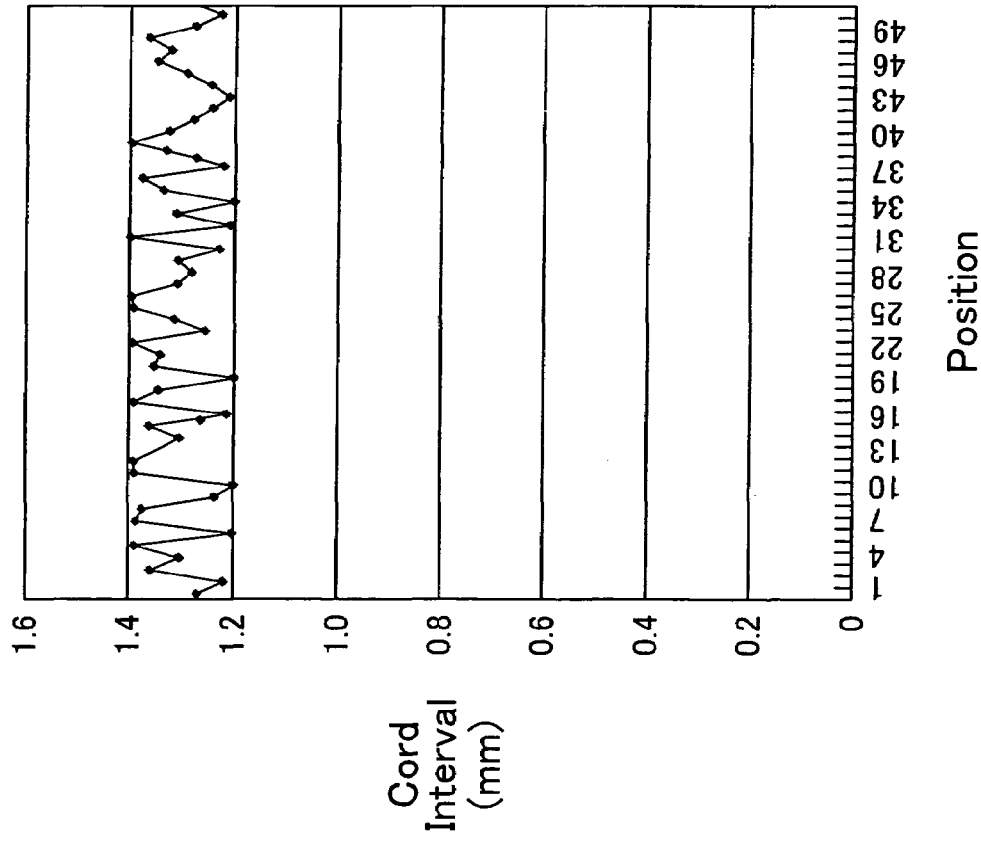
FIG. 19 is a graph showing the cord intervals in a region III of FIG. 18.
Figure 31:
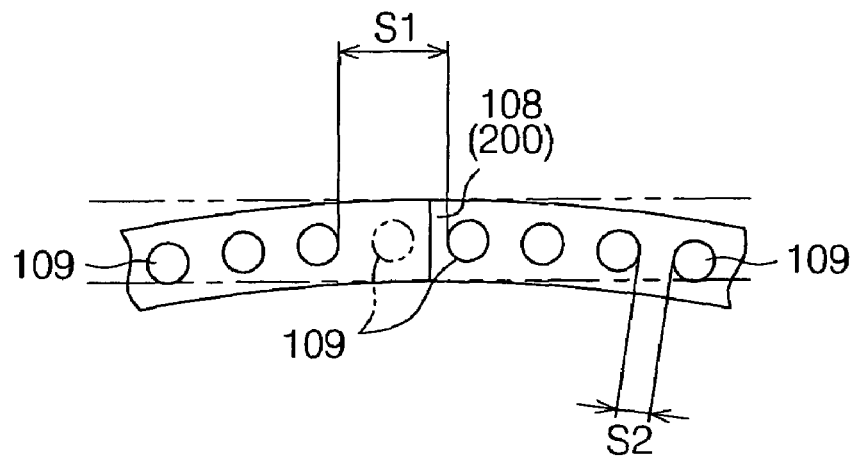
FIG. 31 is a partially cross-sectional view illustrating a joint of a prior art belt.
Figure 32:
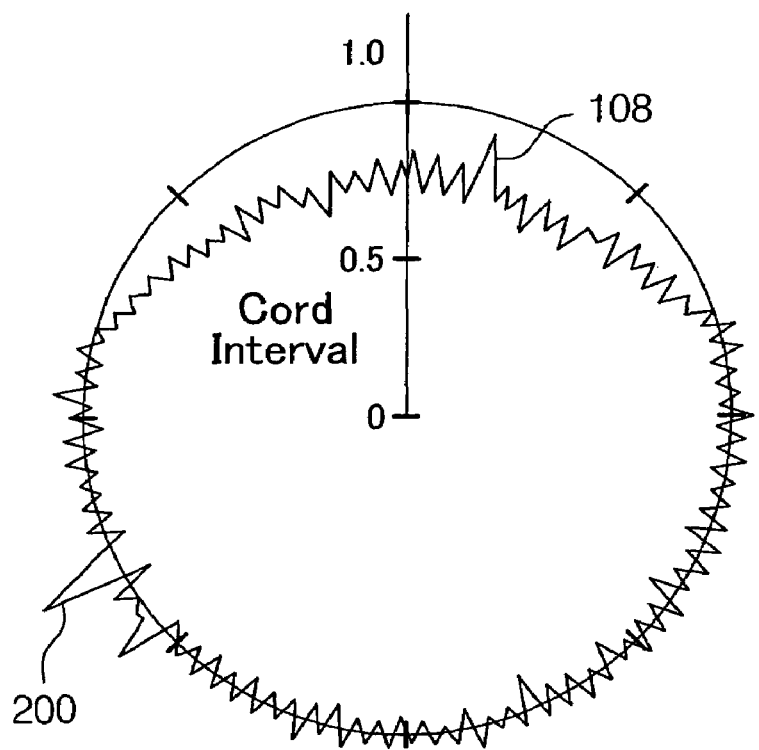
FIG. 32 is a diagram for explaining the cord arrangement of the belt shown in FIG. 31.
Figure 34:
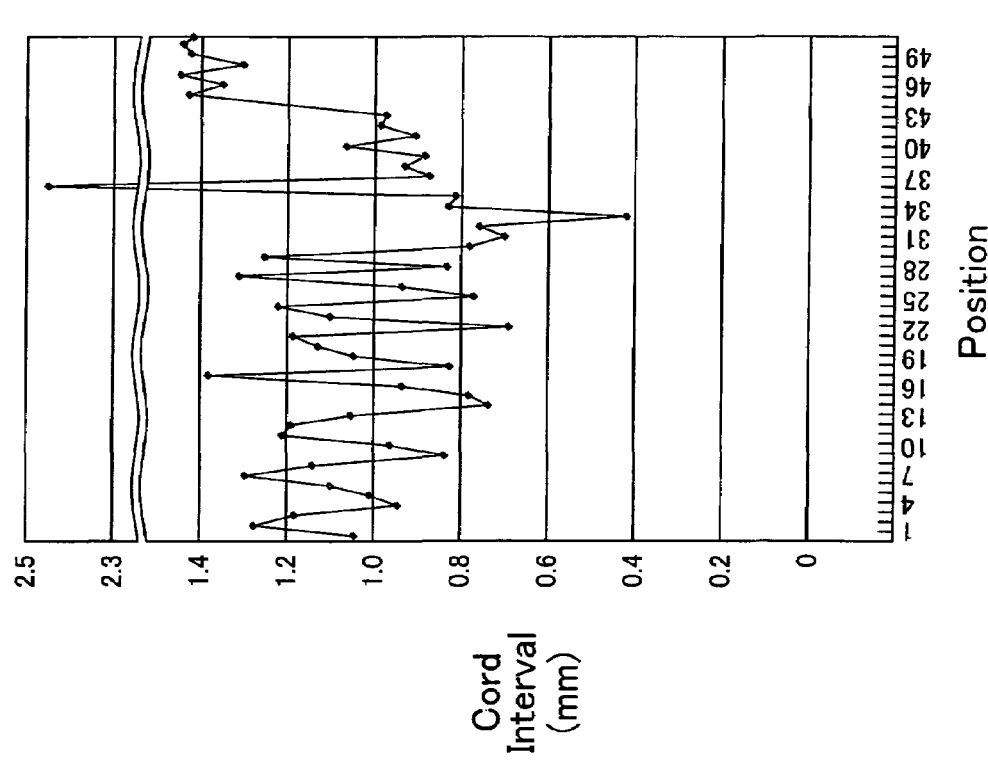
FIG. 34 is a graph showing the cord intervals in the vicinity of the joint 200 of FIG. 32.
Figure 33:
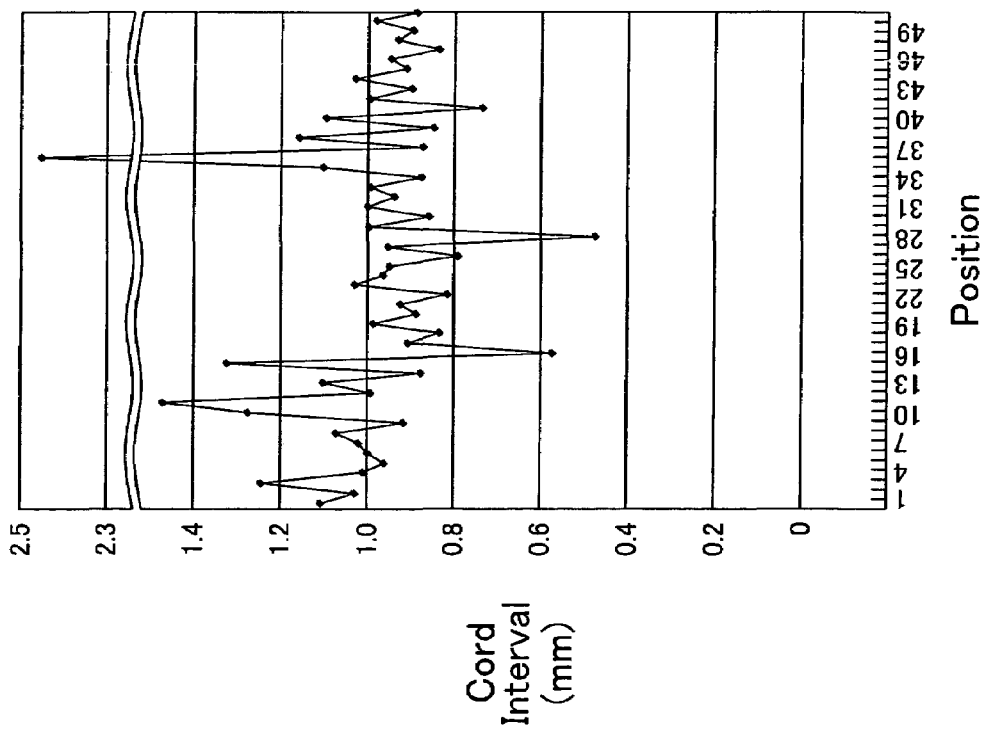
FIG. 33 is a graph showing the cord intervals in the vicinity of the joint 108 of FIG. 32.

FIGS. 18 to 20 are related to the cord intervals in one of the belts 22, 23. The cord intervals in the other one of the belts 22, 23 have the same characteristics. FIG. 18 corresponds to FIG. 32, which shows a prior art. FIG. 19 is a graph showing the cord intervals in the region III of FIG. 18. FIG. 20 is a graph showing the cord intervals in the region V of FIG. 18. As shown in FIGS. 18 to 20, in the belts 22, 23 of this embodiment, the cord interval Q2 in each belt ribbon piece 51 is substantially equal to the cord interval Q1 of each adjacent pair of the belt ribbon pieces 51. Sign J of FIG. 18 represents a part at which the ends of the plate body 88 are butted against each other. The cord intervals Q1, Q2 are in a relatively narrow fluctuation range along the entire circumference of each of the belts 22, 23, including the butted part J. The cord intervals Q1, Q2 are within 0.1 to 2.5 times the diameter of the belt cords 52. In this embodiment, unlike the prior art shown in FIG. 31, the belt cords in the vicinity of the butted part need not be removed.

The first and second belts 22, 23 are stacked as shown in FIG. 13. In this state, the cap belt 24 and rubber forming the tread 31 are wound around the outer circumference of the stacked belts 22, 23 to form the belt tread assembly. The belt tread assembly is fitted about a toroidal body ply 21, so that rubber forming the sidewalls 33 is attached to both sides of the body ply 21. Accordingly, a green tire to be vulcanized is completed. The green tire is then vulcanized to manufacture the radial pneumatic tire 11 shown in FIG. 1.

In the tire 11, the cords 42 in the body ply 21 and the cords 52 in the belts 22, 23 are arranged at substantially equal intervals over the entire circumference of the tire 11. That is, in the body ply 21 and the belts 22, 23, the cord intervals P2, Q1 between each-adjacent ribbon pieces 41, 51 is substantially equal to the cord intervals P1, Q2 in each ribbon piece 41, 51. In either of the body ply 21 and the belts 22, 23, the deviation of the cord interval from the specified value is within a range of ±25% of the specified value. The embodiment has significantly less fluctuations compared to the prior art.

Therefore, the weight balance of the tire 11 in the circumferential direction is substantially uniform. As a result, the number or the size of the balancing weight attached to the wheel rim can be reduced. Further the necessity for attaching the balancing weights to the wheel rim is eliminated. Accordingly, the procedure for attaching the tire 11 to the wheel rim can be simplified. The tire 11 having a high consistency as a product can be produced.

A second embodiment will now be described. The differences from the first embodiment will be mainly discussed.

First, the method for manufacturing the body ply 21 will be described. In this embodiment, when winding the ply ribbon 44 around the drum 61, the facing sides of each adjacent pair of turns of the ply ribbon 44 are pressed against each other with a predetermined force by a couple of inclined wheels 63, which are synchronously rotated, as shown in FIG. 8(b). Accordingly, a cylindrical body 65 having a predetermined axial length is formed.

In this manner, the ply ribbon 44 is wound while being pressed by the pressing wheels 63. Accordingly, the interval P2 between the ply cords 42 at the facing ends of each adjacent pair of turns of the ribbon 44 is less than the cord interval P1 in each ply ribbon 44, as shown in FIG. 3(c). The cord interval P2 can be changed by varying the pressing force applied by the pressing wheels 63.

Next, as in the same manner as the first embodiment, a plate body 66 shown in FIG. 6 is obtained through a process for cutting the cylindrical body 65 shown in FIG. 5.

Next, as in the first embodiment, the plate body 66 is wound around a drum 67 as shown in FIG. 9. Then, the end faces of the plate body 66 are butted against each other by pressing members 68, 69, which are rollers. The pressing members 68, 69 press the end faces of the plate body 66 against each other with a force stronger than in the first embodiment. As a result, the interval between the ply cords 42 of the end faces, which are butted against each other, is equal to the cord interval P2.

Thereafter, when a cylindrical pre-body ply 70 is expanded to be toroidal, the cord intervals P1 at parts of the ply ribbon pieces 41 that are not pressed are made wider than the cord intervals P2 at the pressed parts of the ply ribbon pieces 41. Therefore, in the finished toroidal body ply 21, the difference between the cord interval P1 and the cord interval P2 is greater than in the cylindrical pre-body ply 70. That is, in the body ply 21 of this embodiment, the ply cords 42 are dense in the pressed parts of the ply ribbon pieces 41 than in the other parts.

Figure 21:
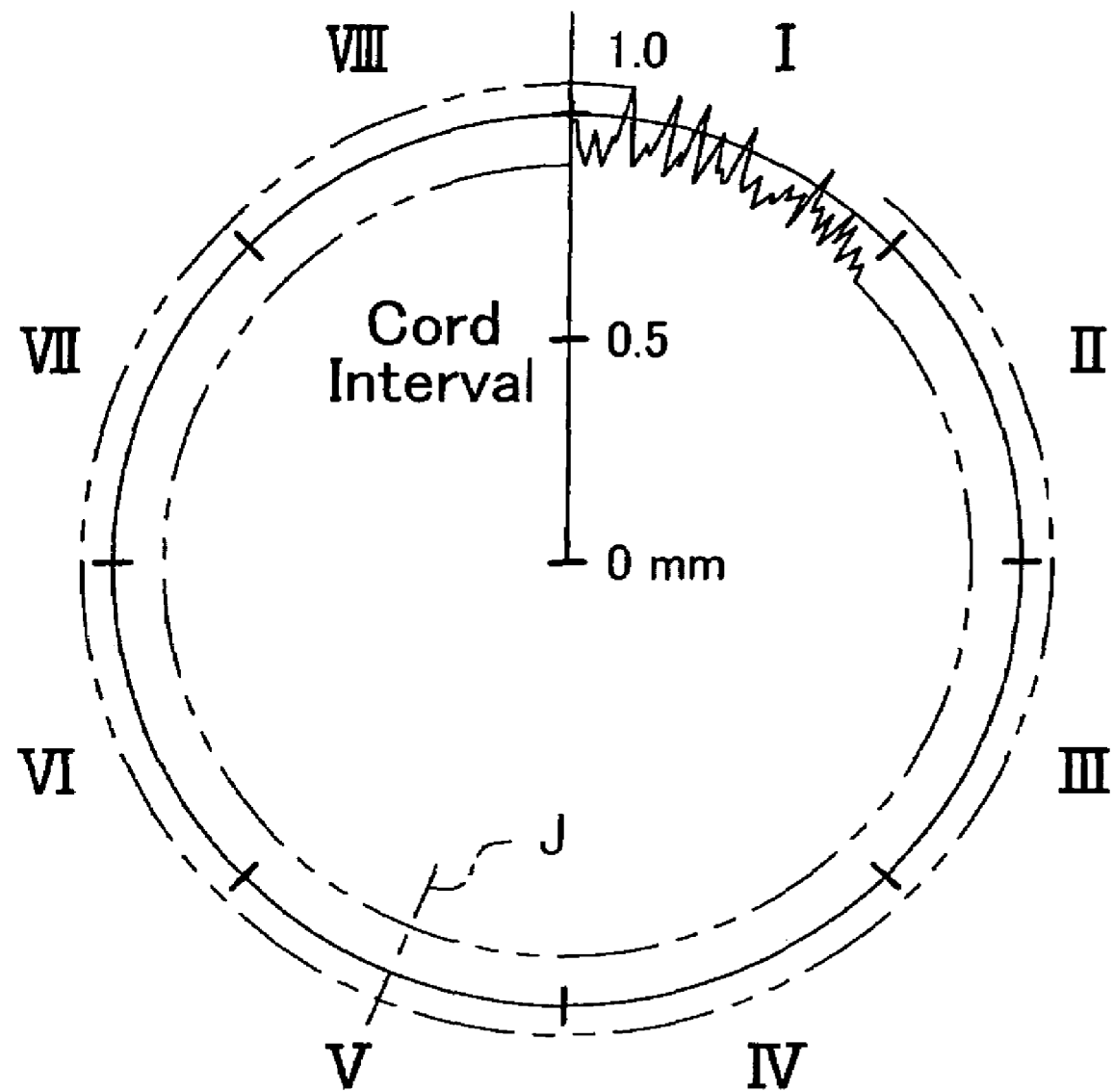
FIG. 21 is a diagram for explaining the cord arrangement of the body ply according to the second embodiment.
Figure 22:
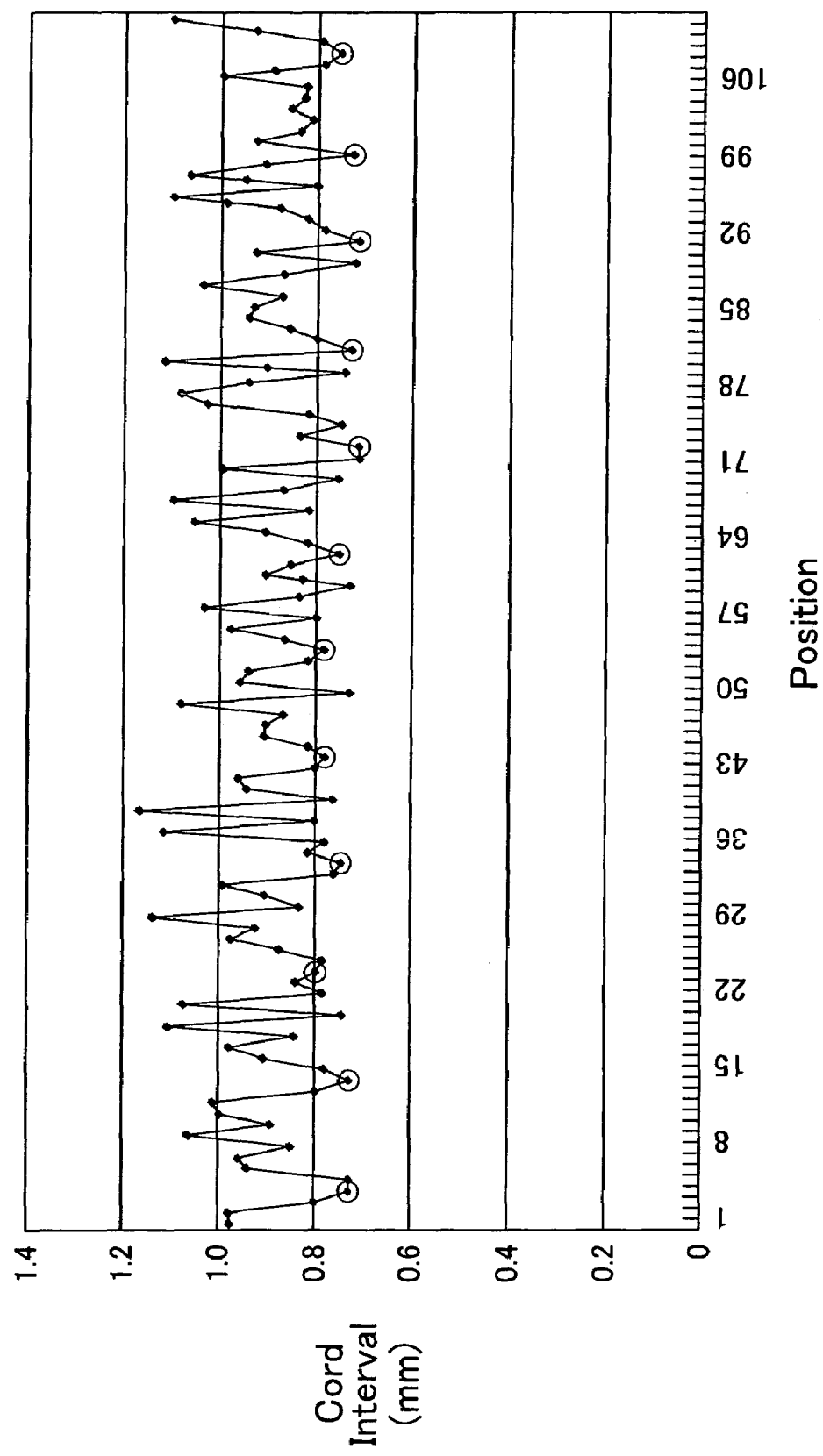
FIG. 22 is a graph showing the cord intervals in a region III of FIG. 21.
Figure 23:
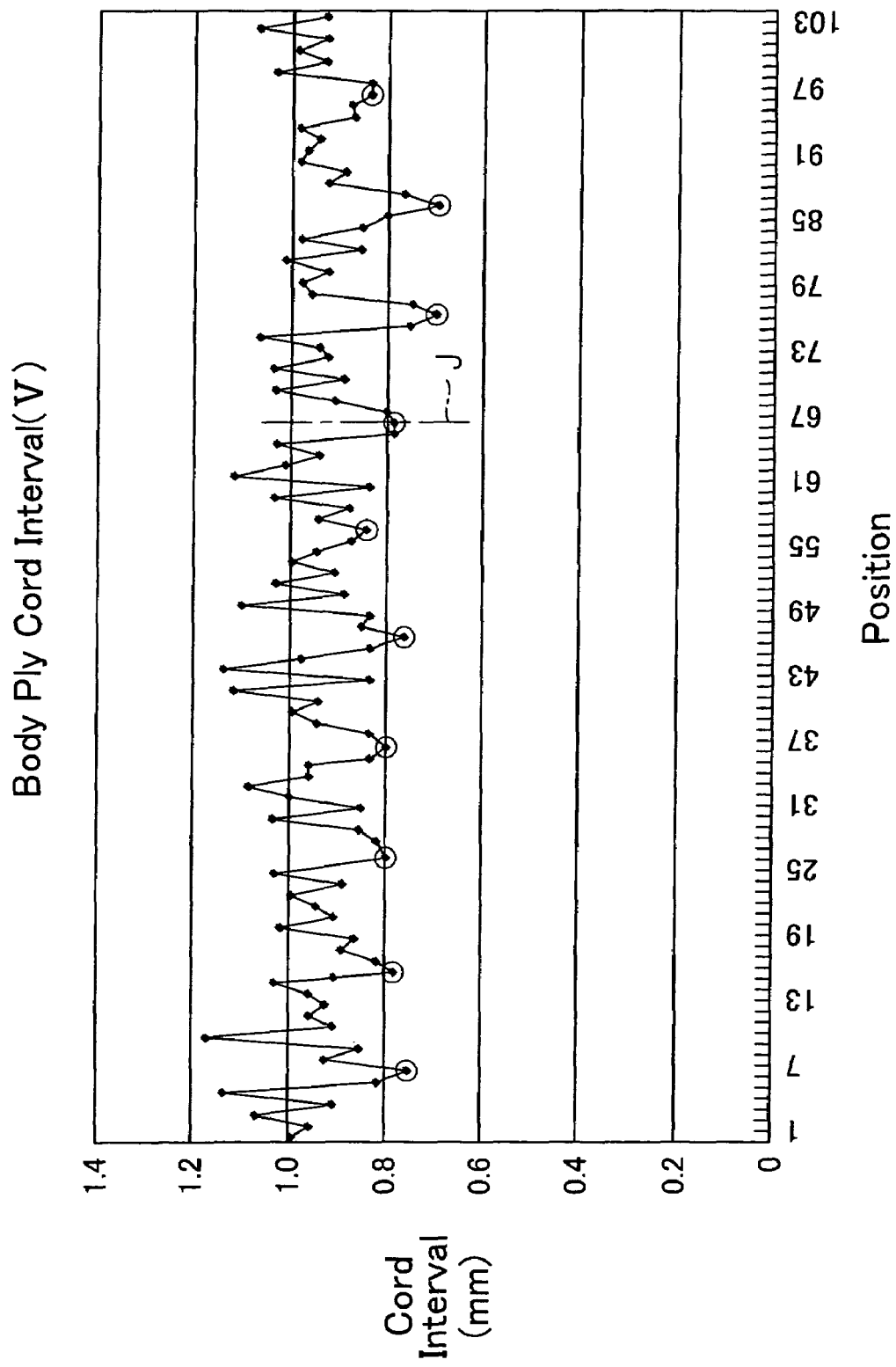
FIG. 23 is a graph showing the cord intervals in a region V of FIG. 21.

FIGS. 21, 22, 23 show the cord intervals in the body ply 21 of this embodiment. As shown in FIG. 3(c), each ply ribbon piece 41 has ten ply cords 42. In the body ply 21 of this embodiment, groups of ten ply cords 42, which are arranged at the substantially constant cord interval P1, are arranged regularly at equal intervals over the entire circumference of the body ply 21. Each adjacent pair of the ply cord groups are spaced by the cord interval P2, which is narrower than the cord interval P1. That is, the narrow cord interval P2 appears at every ten ply cords 42. In FIGS. 22 and 23, the circled dots represent the narrow intervals P2 between the adjacent ply cord groups.

Next, a method for manufacturing the first and second belts 22, 23 will be described. In this embodiment, when the belt ribbon 54 is wound around a drum 82 shown in FIG. 15, each adjacent pair of turns of the belt ribbon 54 are pressed against each other with a predetermined force. Therefore, as shown in FIG. 14(c), the interval Q1 between the belt cords 52 at the facing ends of each adjacent pair of turns of the belt ribbon 54 is less than the cord interval Q2 in the belt ribbon 54.

Then, the cylindrical body 86 formed by winding the belt ribbon 54 is cut as shown in FIG. 16 in the manner similar to the first embodiment so that a plate body 88 shown in FIG. 17 is obtained. As in the first embodiment, the plate body 88 is wound around a belt forming drum, and the ends of the plate body 88 are butted against each other. The end faces of the plate body 88 are pressed against each other with a force greater than in the first embodiment. As a result, the interval between the belt cords 52 of the butted end faces of the plate body 88 is equal to the cord interval Q1.

Figure 24:
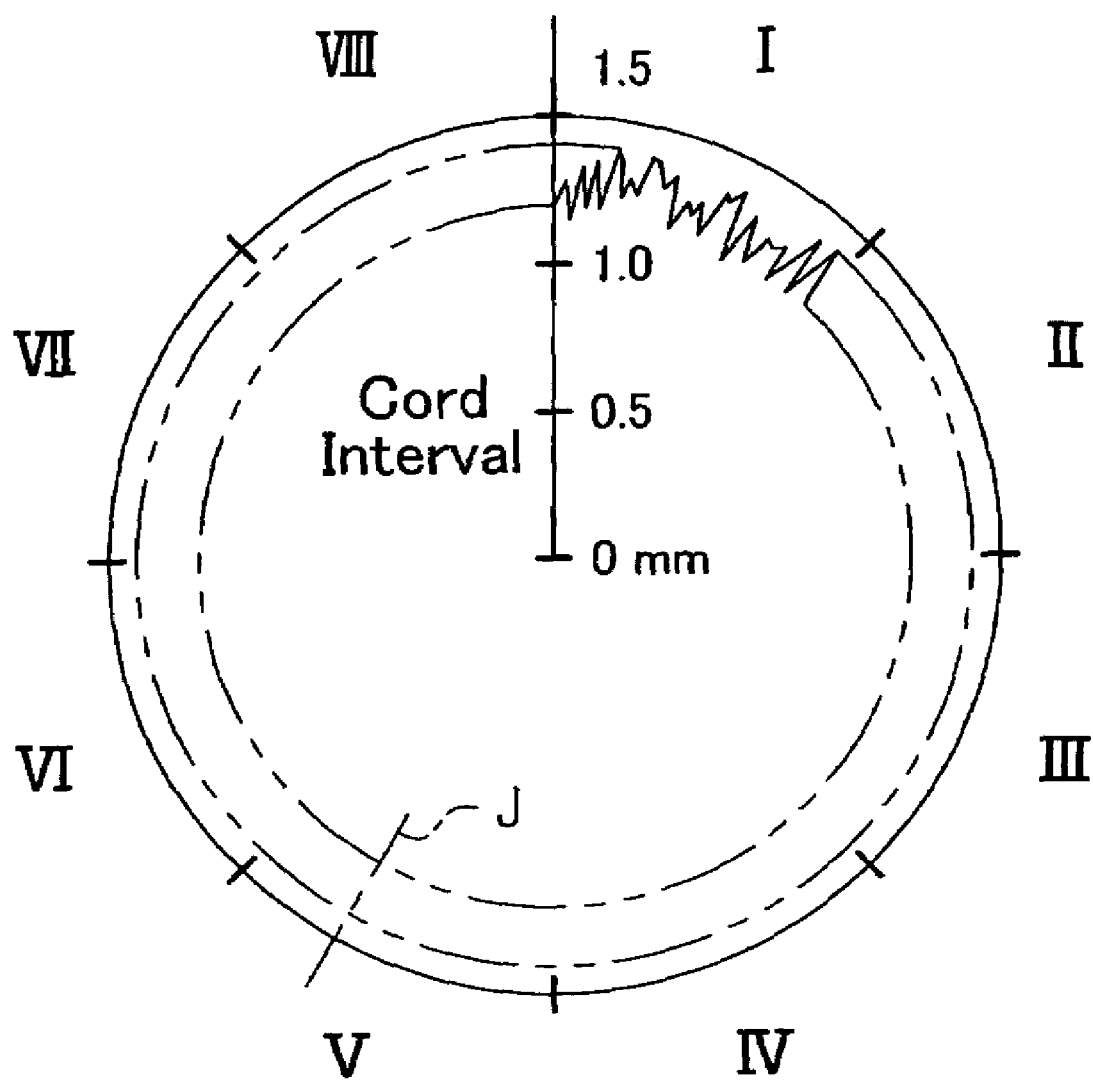
FIG. 24 is a diagram for explaining the cord arrangement of the belt according to the second embodiment.
Figure 25:
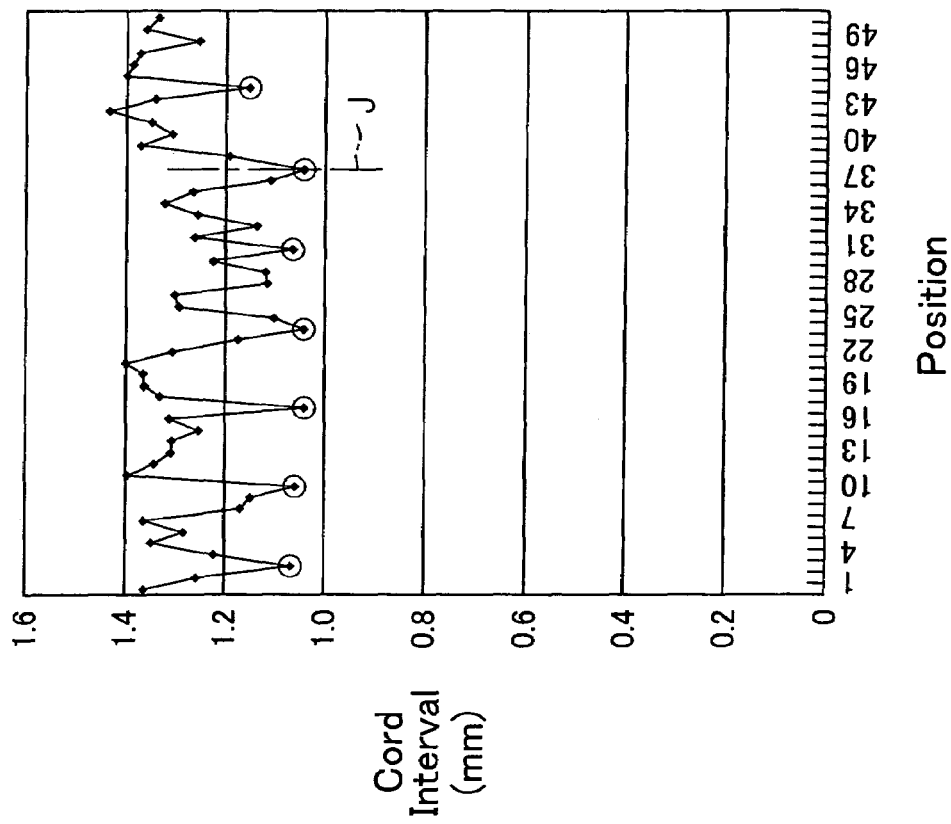
FIG. 25 is a graph showing the cord intervals in a region III of FIG. 24.
Figure 26:
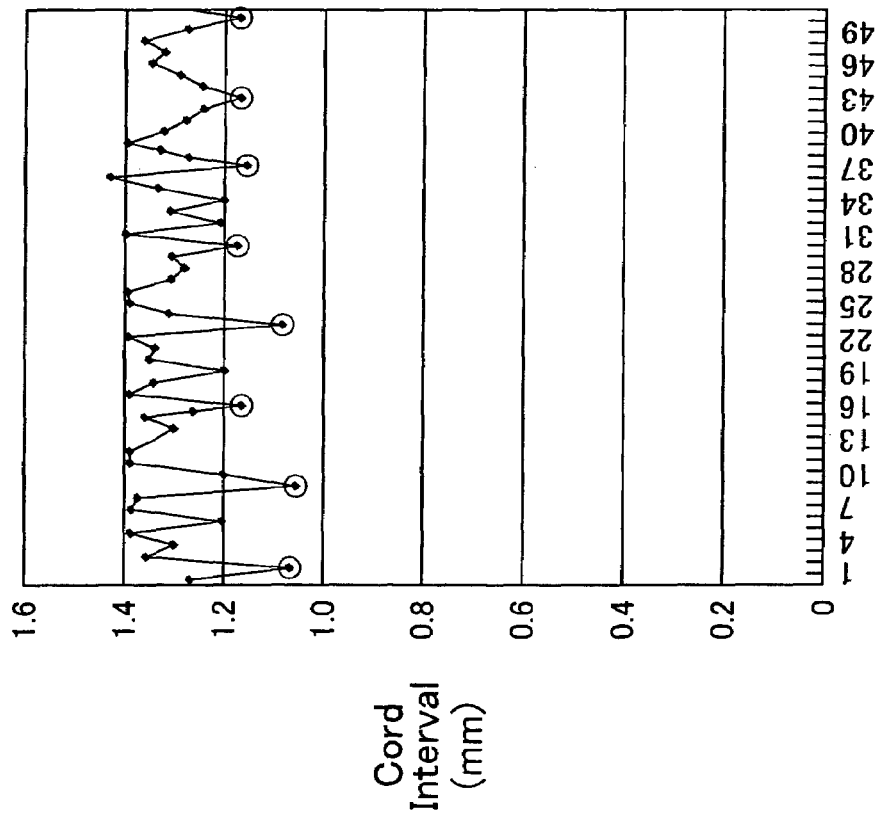
FIG. 26 is a graph showing the cord intervals in a region V of FIG. 24.

FIGS. 24, 25, 26 show the cord intervals in one of the belts 22, 23. The cord intervals in the other one of the belts 22, 23 have the same characteristics. As shown in FIG. 14(c), each belt ribbon piece 51 has seven belt cords 52.

Therefore, in the belts 22, 23 of this embodiment, the groups of seven belt cords 52, which are substantially equally spaced by the cord interval Q2, are arranged regularly at equal intervals over the entire circumference of the belts 22, 23. Each adjacent pair of the ply cord groups are spaced by the cord interval Q1, which is narrower than the cord interval Q2. That is, the narrow cord interval Q1 appears at every seven belt cords 52. In FIGS. 25 and 26, the circled dots represent the narrow intervals Q1 between the adjacent belt cord groups.

In the pneumatic tire 11 having the above described body ply 21 and the belts 22, 23, the cords 42 for the body ply 21 and the cords 52 for the belts 22, 23 are regularly arranged at substantially equal intervals over the entire circumference of the tire 11. That is, in the circumferential direction of the tire 11, the cords 42, 52 form a cyclic and regular pattern. Therefore, although the cord intervals are not equal over the entire circumference of the tire 11, the weight balance in the circumferential direction is improved. This embodiment therefore has the same advantages as the first embodiment.

It should be apparent to those skilled in the art that the present invention may be embodied in many other specific forms without departing from the spirit or scope of the invention. Particularly, it should be understood that the invention may be embodied in the following forms.

In the second embodiment, the cord interval P2, Q1 at each joint of the adjacent ribbon pieces 41, 51 is narrower than the cord interval P1, Q2 in each ribbon piece 41, 51. However, to the contrary, the cord interval P2, Q1 at each joint of the adjacent ribbon pieces 41, 51 may be greater than the cord interval P1, Q2 in each ribbon piece 41, 51. This increases the amount of rubber in the vicinity of each joint of the ribbon pieces 41, 51 and thus improves the joint property between each adjacent pair of the ribbon pieces 41, 51.

In the first embodiment, the deviation of the cord interval P2, Q1 at the joint of each adjacent pair of the ribbon pieces 41, 51 from the specified value of the cord interval P1, Q2 in each ribbon piece 41, 51 is preferably within ±25% of the specified value. More preferably, the deviation is within ±11% of the specified value.

In the second embodiment, when coating the cords 42, 52 with rubber 43, 53, the cord intervals in the finished ribbons 44, 54 may be made at random by adjusting the intervals of the cord grooves in the comb guide and in the rubber extruder. Even if this is the case, the cords 42 for the body ply 21 and the cords 52 of the belts 22, 23 form a regular and cyclic pattern over the entire circumference of the tire 11.

As an example of random (varied) cord intervals in the ribbons 44, 54, the cord intervals of the parallel cords 42, 52 in the central portion may be less than those in the regions close to the sides. Alternatively, the cord intervals in the central portion may be greater than those in the regions near the sides. Further, in each group of the parallel cords 42, 52 in the ribbons 44, 54, the cord intervals may vary at a predetermined pattern several times.

That is, groups of parallel cords having predetermined patterns may be consecutively arranged over the circumference of the tire 11 such that regular code arrangement cycle is formed over the entire circumference of the tire 11. In other words, the cord arrangement may be varied as long as the cords are divided into a plurality of groups along the circumference of the tire 11 and the groups have the identical arrangement pattern.

The cross-sections of the ply ribbon 44 of FIG. 3(a) and the belt ribbon 54 of FIG. 14(a) are parallelogram. However, the cross-sections of the ply ribbon 44 and the belt ribbon 54 may be changed as necessary. For example, as shown in FIGS. 3(d) and 14(d), the ply ribbon 44 and the belt ribbon 54 may have rectangular cross-sections. Alternatively, as illustrated by chain double-dashed lines in FIGS. 3(d) and 14(d), the ribbons 44, 54 may have trapezoidal cross-sections.

The number of the cords 42, 52 in the ribbons 44, 54 may be changed as necessary.

The present invention may be applied to a tire having two or more layered body plies. The present invention may also be applied to a tire having a single ribbon.

The invention claimed is:

1. A pneumatic tire having a tire framework, wherein the tire framework includes a plurality of ribbon pieces arranged along the circumferential direction of the tire, each ribbon piece being joined to the adjacent ribbon pieces at the sides in the lateral direction, wherein each ribbon piece has a plurality of cords and rubber coating all of the corresponding cords, wherein the cords extend in the longitudinal direction of the ribbon piece and are arranged in parallel, wherein all the cords of each ribbon piece form one cord group forming a specific cord arrangement pattern that is identical to the cord arrangement pattern of the cord groups of the other ribbon pieces, wherein the cord groups are consecutively and uniformly arranged along the circumferential direction of the tire so that the specific cord arrangement pattern repeatedly appears over the entire circumference of the tire, and wherein the specific cord arrangement pattern is formed by varying the cord interval in each cord group such that the cord interval at a central region is smaller than that at side regions.

2. The pneumatic tire according to claim 1, wherein the tire framework is a body ply, and the cords are arranged to extend in the radial direction of the tire, wherein the body ply has a uniform layer structure over the entire circumference of the tire.

3. The pneumatic tire according to claim 1, wherein the tire framework is a belt, and the cords are arranged to be inclined relative to the circumferential direction of the tire, wherein the belt has a uniform layer structure over the entire circumference of the tire.

4. A method for manufacturing a tire framework of a pneumatic tire providing a tire framework, wherein the tire framework includes a plurality of ribbon pieces arranged along the circumferential direction of the tire, each ribbon piece being joined to the adjacent ribbon pieces at the sides in the lateral direction, wherein each ribbon piece has a plurality of cords and rubber coating all of the corresponding cords, wherein the cords extend in the longitudinal direction of the ribbon piece and are arranged in parallel, wherein all the cords of each ribbon piece form one cord group forming a specific cord arrangement pattern that is identical to the cord arrangement pattern of the cord groups of the other ribbon pieces, wherein the cord groups are consecutively and uniformly arranged along the circumferential direction of the tire so that the specific cord arrangement pattern repeatedly appears over the entire circumference of the tire, and wherein the specific cord arrangement pattern is formed by varying the cord interval in each cord group such that the cord interval at a central region is smaller than that at side regions, comprising:

preparing a long ribbon having one group of a plurality of cords coated with rubber, the cords being arranged in parallel to form the specific cord arrangement pattern;

forming a cylindrical body by helically winding the long ribbon, wherein the sides of each adjacent pair of turns of the ribbon are joined;

cutting the cylindrical body to obtain a plate body, wherein, when the cylindrical body is cut, the long ribbon is divided into the plurality of the ribbon pieces with each adjacent pair joined to each other, and the plate body having the parallel ribbon pieces is obtained; and forming the tire framework from the plate body, wherein the plate body is made annular to form the tire framework, and wherein the sides of the two ribbon pieces at the ends of the annular plate body are joined.

5. The method according to claim 4, wherein, when the cylindrical body is formed by helically winding the long ribbon, the sides of each adjacent pair of turns of the ribbon are joined while being pressed against each other with a predetermine force.

6. The method according to claim 5, wherein the sides of each adjacent pair of turns of the ribbon are pressed against each other by a pair of wheels.

* * * * *